United States Patent
Na et al.

(10) Patent No.: US 9,936,223 B2
(45) Date of Patent: Apr. 3, 2018

(54) METHOD AND DEVICE FOR ENCODING VIDEO TO IMPROVE INTRA PREDICTION PROCESSING SPEED, AND METHOD AND DEVICE FOR DECODING VIDEO

(71) Applicant: SAMSUNG ELECTRONICS CO., LTD., Suwon-si (KR)

(72) Inventors: Sang-kwon Na, Seoul (KR); Ki-won Yoo, Seoul (KR); Jae-Hyun Kim, Seoul (KR); Kyo-hyuk Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 605 days.

(21) Appl. No.: 14/336,326

(22) Filed: Jul. 21, 2014

(65) Prior Publication Data

US 2014/0328404 A1    Nov. 6, 2014

Related U.S. Application Data

(63) Continuation of application No. PCT/KR2013/000489, filed on Jan. 21, 2013.

(Continued)

(51) Int. Cl.
*H04N 7/12* (2006.01)
*H04N 11/02* (2006.01)
*H04N 11/04* (2006.01)
*H04N 19/593* (2014.01)
*H04N 19/436* (2014.01)

(Continued)

(52) U.S. Cl.
CPC ......... *H04N 19/593* (2014.11); *H04N 19/436* (2014.11); *H04N 19/46* (2014.11); *H04N 19/96* (2014.11)

(58) Field of Classification Search
None
See application file for complete search history.

(56) References Cited

U.S. PATENT DOCUMENTS 8,792,547 B2   7/2014 Min
2007/0098070 A1   5/2007 Saigo et al.
(Continued)

FOREIGN PATENT DOCUMENTS

KR   10-2011-0090065 A   8/2011
KR   10-2011-0126485 A   11/2011

OTHER PUBLICATIONS

Communication dated May 15, 2013 issued by the International Searching Authority in counterpart International Application No. PCT/KR2013/000489.

*Primary Examiner* — Sath V Perungavoor
*Assistant Examiner* — Xiaolan Xu
(74) *Attorney, Agent, or Firm* — Sughrue Mion, PLLC

(57) ABSTRACT

Provided are a method and a device for encoding a video to improve an intra prediction processing speed, and a method and a device for decoding the video. The method for encoding a video performs parallel intra prediction and includes: obtaining, by using pixels of peripheral blocks processed prior to a plurality of adjacent blocks, reference pixels used for intra prediction of each of the plurality of adjacent blocks; performing, by using the obtained reference pixels, intra prediction in parallel for each of the plurality of adjacent blocks; and adding reference pixel syntax information to a bitstream.

6 Claims, 21 Drawing Sheets

Related U.S. Application Data

(60) Provisional application No. 61/588,650, filed on Jan. 19, 2012.

(51) Int. Cl.
*H04N 19/46* (2014.01)
*H04N 19/96* (2014.01)

(56) References Cited

U.S. PATENT DOCUMENTS

| | | |
|---|---|---|
| 2008/0031329 A1 | 2/2008 | Kenichi Iwata et al. |
| 2008/0056363 A1 | 3/2008 | Lyashevsky et al. |
| 2012/0236936 A1* | 9/2012 | Segall .................. H04N 19/105 375/240.08 |
| 2013/0064292 A1 | 3/2013 | Song et al. |

* cited by examiner

CODING UNIT (1010)

PREDICTION UNIT (1060)

METHOD AND DEVICE FOR ENCODING VIDEO TO IMPROVE INTRA PREDICTION PROCESSING SPEED, AND METHOD AND DEVICE FOR DECODING VIDEO

CROSS-REFERENCE TO RELATED APPLICATIONS

This application is a continuation of PCT/KR2013/000489, filed on Jan. 21, 2013, which claims the benefit of U.S. Provisional Application No. 61/588,650, filed on Jan. 19, 2012, all the disclosures of which are incorporated herein in their entireties by reference.

BACKGROUND

1. Field

Apparatuses and methods consistent with exemplary embodiments relate to encoding and decoding of a video, and more particularly, to encoding and decoding of a video to improve an intra prediction processing speed by limiting the number of intra predicted blocks or performing parallel intra prediction by reducing the dependency between the intra predicted blocks.

2. Description of the Related Art

In order to encode a video via an image compression method such as MPEG-1, MPEG-2, MPEG-4, and H.264/MPEG-4 AVC (Advanced Video Coding), one picture is split into macroblocks. Each of the macroblocks is encoded by applying all encoding modes usable for inter prediction or intra prediction. Then, the macroblocks are encoded by selecting an encoding mode according to a bit rate used for the encoding of the macroblocks and a degree of distortion between the original macroblock and an encoded macroblock.

An intra predicted block includes pixels of adjacent blocks as reference pixels. Accordingly, intra prediction may not be performed prior to the completion of processing the adjacent blocks. Thus, the intra predicted block and the adjacent block are not performed in parallel.

SUMMARY

Aspects of one or more exemplary embodiments enable parallel intra prediction on adjacent blocks by reducing the dependency between intra predicted blocks. Also, aspects of one or more exemplary embodiments improve an intra prediction processing speed by restricting intra prediction for a block having a size less than or equal to a predetermined size.

According to aspects of one or more exemplary embodiments, a reference pixel used for intra prediction of each of a plurality of adjacent blocks is obtained by using pixels of peripheral blocks that are processed prior to the adjacent blocks. Accordingly, intra prediction is performed in parallel for the respective adjacent blocks by using the obtained reference pixels.

Furthermore, according to aspects of one or more exemplary embodiments, parallel intra prediction between adjacent blocks may be performed. Also, according to aspects of one or more exemplary embodiments, an intra prediction processing speed may be increased.

According to an aspect of an exemplary embodiment, there is provided a method of encoding a video to perform parallel intra prediction, the method including: obtaining, by using pixels of peripheral blocks that are processed prior to a plurality of adjacent blocks, reference pixels used for intra prediction of each of the plurality of adjacent blocks; performing, by using the obtained reference pixels, intra prediction in parallel on each of the plurality of adjacent blocks; and adding, to a bitstream, reference pixel syntax information indicating whether the pixels of the peripheral blocks are used as the reference pixels for intra prediction of each of the plurality of adjacent blocks.

According to an aspect of another exemplary embodiment, there is provided a device for encoding a video to perform parallel intra prediction, the device including: a reference pixel acquirer configured to obtain, by using pixels of peripheral blocks that are processed prior to a plurality of adjacent blocks, reference pixels used for intra prediction of each of the plurality of adjacent blocks; an intra prediction performer configured to perform, by using the obtained reference pixels, intra prediction in parallel on the plurality of adjacent blocks; and an entropy encoder configured to add, to a bitstream, reference pixel syntax information indicating whether the pixels of the peripheral blocks are used as the reference pixels for intra prediction of each of the plurality of adjacent blocks.

According to an aspect of another exemplary embodiment, there is provided a method of decoding a video to perform parallel intra prediction, the method including: obtaining, from a bitstream, reference pixel syntax information indicating whether pixels of peripheral blocks that are processed prior to a plurality of adjacent blocks are used as reference pixels for intra prediction of each of the plurality of adjacent blocks; if the obtained reference pixel syntax information indicates that the pixels of the peripheral blocks are used as reference pixels for intra prediction of each of the plurality of adjacent blocks, obtaining the reference pixels used for the intra prediction of each of the plurality of adjacent blocks by using the pixels of the peripheral blocks; and performing intra prediction in parallel on each of the plurality of adjacent blocks by using the obtained reference pixels.

According to an aspect of another exemplary embodiment, there is provided a device for decoding a video to perform parallel intra prediction, the device including: an entropy decoder configured to obtain, from a bitstream, reference pixel syntax information indicating whether pixels of peripheral blocks that are processed prior to a plurality of adjacent blocks are used as reference pixels for intra prediction of each of the plurality of adjacent blocks; a reference pixel acquirer configured to obtain, by using the pixels of the peripheral blocks, reference pixels used for intra prediction of each of the plurality of adjacent blocks, if the obtained reference pixel syntax information indicates that the pixels of the peripheral blocks are used as the reference pixels for the intra prediction of each of the plurality of adjacent blocks; and an intra prediction performer configured to perform intra prediction in parallel on each of the plurality of adjacent blocks by using the obtained reference pixels.

According to an aspect of another exemplary embodiment, there is provided a method of encoding a video, the method including: splitting a picture by a maximum coding unit having a maximum size; encoding the maximum coding unit by splitting the maximum coding unit into coding units having a hierarchical structure; obtaining, from among the coding units included in the maximum coding unit, a number of intra predicted coding units having a size less than or equal to a predetermined critical size; if the obtained number of the intra predicted coding units exceeds a predetermined critical value, merging intra predicted coding units having the size less than or equal to the predetermined critical size, the intra predicted coding units being adjacent to each other and included in the maximum coding unit, such that the number of the intra predicted coding units having the size less than or equal to the predetermined critical size becomes less than or equal to the predetermined critical value; and performing prediction encoding on the merged intra predicted coding units.

According to an aspect of another exemplary embodiment, there is provided a device for encoding a video, the device including: an image encoder configured to split a picture by a maximum coding unit having a maximum size and encoding the maximum coding unit by splitting the maximum coding unit into coding units having a hierarchical structure; and a merger configured to obtain, from among the coding units included in the maximum coding unit, a number of intra predicted coding units having a size less than or equal to a predetermined critical size, and merging intra predicted coding units having the size less than or equal to the predetermined critical size, the intra predicted coding units being adjacent to each other and included in the maximum coding unit, such that the number of the intra predicted coding units having the size less than or equal to the predetermined critical size becomes less than or equal to the predetermined critical value, if the obtained number of the intra predicted coding units having the size less than or equal to the predetermined critical size exceeds the predetermined critical value, wherein the image encoder performs prediction encoding again on a merged coding unit.

DETAILED DESCRIPTION OF EXEMPLARY EMBODIMENTS

Exemplary embodiments will now be described more fully with reference to the accompanying drawings.

Figure 1:
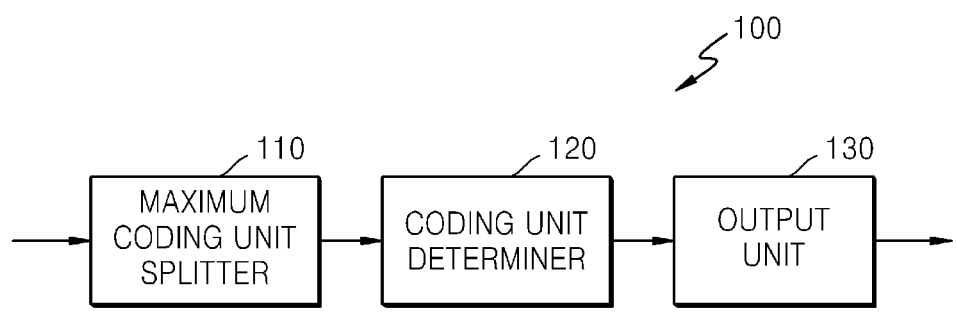
FIG. 1 is a block diagram of a video encoding device according to an exemplary embodiment.

FIG. 1 is a block diagram of a video encoding device according to an exemplary embodiment.

A video encoding device 100 according to the present exemplary embodiment includes a maximum coding unit splitter 110, a coding unit determiner 120, and an output unit 130.

The maximum coding unit splitter 110 may split a current picture based on a maximum coding unit that is a coding unit of a maximum size for the current picture of an image. If the current picture is larger than the maximum coding unit, image data of the current picture may be split by at least one maximum coding unit. The maximum coding unit according to an exemplary embodiment may be a data unit having a size of 32×32, 64×64, 128×128, 256×256, etc., the data unit having the shape of a square with a width and length in power of 2 greater than 8. The image data may be output to the coding unit determiner 120 according to the at least one maximum coding unit.

A coding unit according to an exemplary embodiment may be characterized by a maximum size and a depth. The depth denotes the number of frequencies at which the coding unit is spatially split from the maximum coding unit, and as the depth increases, deeper coding units according to depths may be split from the maximum coding unit to a minimum coding unit. A depth of the maximum coding unit is an uppermost depth and a depth of the minimum coding unit is a lowermost depth. Since a size of the deeper coding units according to depths decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of frequencies at which a height and a width of the maximum coding unit are hierarchically split, may be predetermined.

The coding unit determiner 120 encodes at least one split region obtained by splitting a region of the maximum coding unit according to depths, and determines a depth to output a final encoding result according to the at least one split region. In other words, the coding unit determiner 120 determines a coded depth by encoding the image data in the deeper coding units according to depths, according to the maximum coding unit of the current picture, and by selecting a depth having the least encoding error. The determined coded depth and the image data according to the maximum coding unit are finally output to the output unit 130.

The image data in the maximum coding unit is encoded based on the deeper coding units corresponding to at least one depth smaller than or equal to the maximum depth, and results of encoding based on each of the deeper coding units are compared with one another. A depth having the least encoding error may be selected as a result of comparing encoding errors of the deeper coding units. At least one coded depth may be determined for each maximum coding unit.

The size of the maximum coding unit is split as a coding unit is hierarchically split according to depths and as the number of coding units increases. Also, even when coding units correspond to the same depth in one maximum coding unit, whether to split the coding units to a lower depth is determined by measuring an encoding error of image data of the each coding unit. Accordingly, even when image data is included in one maximum coding unit, the image data has an encoding error according to the depths that varies according to the position and thus the coded depth may be determined to be different according to the position. Thus, one or more coded depths may be set for one maximum coding unit, and the image data of the maximum coding unit may be sectioned according to coding units of at least one coded depth.

Accordingly, the coding unit determiner 120 may determine coding units having a tree structure included in the current maximum coding unit. The "coding units having a tree structure" according to an exemplary embodiment include coding units from among all deeper coding units included in the current maximum coding unit and which correspond to a depth that is determined as the coded depth. The coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting frequencies performed from the maximum coding unit to the minimum coding unit. A first maximum depth according to an exemplary embodiment may denote the total splitting number performed from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit when the maximum coding unit is split once may be set to 1, and a depth of a coding unit when the maximum coding unit is split twice may be set to 2. Here, if a coding unit when the maximum coding unit is split four times is the minimum coding unit, depth levels of depths 0, 1, 2, 3, and 4 exist and thus the first maximum depth may be set to 4, and the second maximum depth may be set to 5.

Prediction encoding and frequency transformation may be performed according to the maximum coding unit. The prediction encoding and the frequency transformation are also performed for each maximum coding unit based on the deeper coding units according to each depth less than or equal to the maximum depth.

Since the number of deeper coding units increases whenever the maximum coding unit is split according to depths, encoding including the prediction encoding and the frequency transformation is performed on all deeper coding units generated as the depth increases. For convenience of description, the prediction encoding and the frequency transformation will now be described based on a coding unit of a current depth among at least one maximum coding unit.

The video encoding device 100 according to an exemplary embodiment may variously select a size or shape of a data unit for encoding the image data. In order to encode the image data, operations, such as prediction encoding, frequency transformation, and entropy encoding, are performed, and the same data unit may be used in all operations or a different data unit may be used for each operation.

For example, the video encoding device 100 may select not only a coding unit for encoding the image data, but also a data unit different from the coding unit to perform the prediction encoding on the image data in the coding unit.

In order to perform prediction encoding in the maximum coding unit, the prediction encoding may be performed based on a coding unit corresponding to a coded depth according to an exemplary embodiment, that is, a coding unit that is no longer split. Hereinafter, the coding unit that is no longer split and becomes a base for prediction encoding will now be referred to as a "prediction unit". A partition obtained by splitting the prediction unit may include a prediction unit or a data unit obtained by splitting at least one of a height and a width of the prediction unit.

For example, when a coding unit of 2N×2N, where N is a positive integer, is no longer split and becomes a prediction unit of 2N×2N, a size of a partition may be 2N×2N, 2N×N, N×2N, or N×N. A partition type according to an exemplary embodiment may selectively include not only symmetrical partitions that are obtained by symmetrically splitting a height or width of the prediction unit, but also partitions obtained by asymmetrically splitting the height or width of the prediction unit at a ratio of such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the inter mode may be applied to a partition having a size of 2N×2N, 2N×N, N×2N, or N×N. The intra mode may be applied to a partition having a size of 2N×2N or N×N. Also, the skip mode may be applied only to a partition having a size of 2N×2N. The encoding is independently performed on one prediction unit in a coding unit, thereby selecting a prediction mode having a least encoding error.

The video encoding device 100 according to an exemplary embodiment may also perform the frequency transformation on the image data in a coding unit based on not only the coding unit for encoding the image data but also a data unit that is different from the coding unit.

In order to perform the frequency transformation in the coding unit, the frequency transformation may be performed based on a data unit having a size smaller than or equal to the coding unit. For example, the data unit for the frequency transformation may include a data unit for an intra mode and a data unit for an inter mode.

A data unit used as a base of the frequency transformation will now be referred to as a "transformation unit". Similarly to the coding unit, the transformation unit in the coding unit may be recursively split into smaller sized regions. Thus, residual data in the coding unit may be sectioned according to the transformation unit having the tree structure according to transformation depths.

A transformation depth indicating the number of frequencies at which splitting is performed to reach the transformation unit by splitting the height and width of the coding unit may also be set for the transformation unit according to an exemplary embodiment. For example, when the size of a transformation unit in a current coding unit of 2N×2N, is 2N×2N, N×N, and N/2×N/2, a transformation depth may be 0, 1, and 2, respectively. That is, the transformation unit having the tree structure may also be set according to transformation depths.

Encoding information according to coding units corresponding to a coded depth requires not only information about the coded depth, but also about information related to prediction encoding and frequency transformation. Accordingly, the coding unit determiner 120 not only determines a coded depth generating a least encoding error, but also determines a partition type obtained by splitting a prediction unit, a prediction mode according to prediction units, and a size of a transformation unit for frequency transformation.

Coding units having a tree structure in a maximum coding unit and a method of determining a partition according to exemplary embodiments will be described in detail later with reference to FIGS. 3 through 12.

The coding unit determiner 120 may measure an encoding error of deeper coding units according to depths by using rate-distortion (RD) optimization based on Lagrangian multipliers.

The output unit 130 outputs the image data of the maximum coding unit, which is encoded based on the at least one coded depth determined by the coding unit determiner 120, and information about the encoding mode according to the coded depth, in a bitstream.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a square data unit obtained by splitting the minimum coding unit constituting the lowermost depth by 4. Alternatively, the minimum unit may be a maximum square data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

In the video encoding device 100, the deeper coding unit may be a coding unit obtained by dividing a height or width of a coding unit of an upper depth, which is one layer above, into halves. In other words, when the size of the coding unit of the current depth is 2N×2N, the size of the coding unit of the lower depth is N×N. Also, the coding unit of the current depth having the size of 2N×2N may include a maximum number of four (4) coding units of the lower depth.

Accordingly, the video encoding device 100 may form the coding units having a tree structure by determining coding units having an optimum shape and an optimum size for each maximum coding unit based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having very high resolution or a very large data amount is encoded in units of related art macroblocks, the number of macroblocks per picture excessively increases. Accordingly, the number of pieces of compressed information generated for each macroblock increases, and thus, a load of transmitting the compressed information increases and data compression efficiency decreases. However, by using the video encoding device according to an exemplary embodiment, image compression efficiency may be increased since a coding unit is adjusted while considering characteristics of an image, increasing a maximum size of a coding unit, and considering a size of the image.

Figure 2:
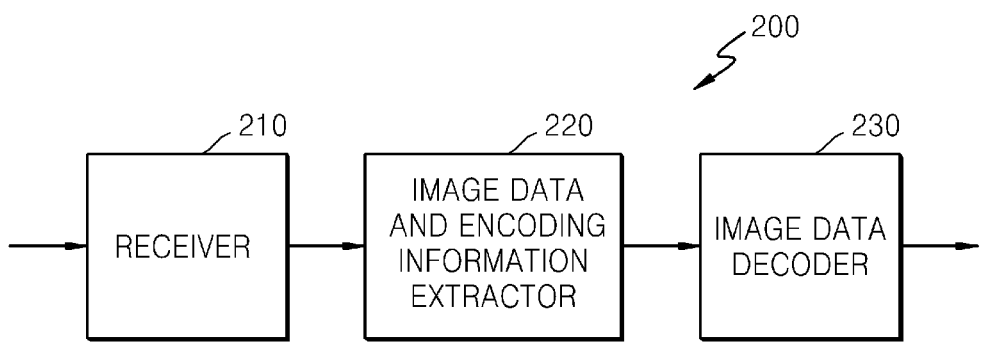
FIG. 2 is a block diagram of a video decoding device according to an exemplary embodiment.

FIG. 2 is a block diagram of a video decoding device according to an exemplary embodiment.

The video decoding device 200 includes a receiver 210, an image data and encoding information extractor 220, and an image data decoder 230. Definitions of various terms such as a coding unit, a depth, a prediction unit, a transformation unit, and information about various encoding modes for various operations of the video decoding device 200 according to an exemplary embodiment are identical to those described with reference to FIG. 1 and the video encoding device 100.

The receiver 205 receives and parses a bitstream of an encoded video. The image data and encoding information extractor 220 extracts encoded image data for each coding unit from the parsed bitstream, in which the coding units have a tree structure according to each maximum coding unit, and outputs the extracted image data to the image data decoder 230. The image data and encoding information extractor 220 may extract information about a maximum size of a coding unit of a current picture from a header about the current picture.

Also, the image data and encoding information extractor 220 extracts from the parsed bitstream information about a coded depth and an encoding mode for the coding units having a tree structure according to each maximum coding unit. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding device 100, repeatedly performs encoding for each deeper coding unit according to depths according to each maximum coding unit. Accordingly, the video decoding device 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred as being the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having a tree structure included in each maximum coding unit. A decoding process may include prediction including intra prediction and motion compensation, and inverse transformation. Inverse transformation may be performed according to a method of inverse orthogonal transformation or inverse integer transformation.

The image data decoder 230 may perform intra prediction or motion compensation according to a partition and a prediction mode of each coding unit and based on the information about the partition type and the prediction mode of the prediction unit of the coding unit according to coded depths.

Also, the image data decoder 230 may perform inverse transformation according to each transformation unit in the coding unit based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered as being one data unit to be decoded by the image data decoder 230 in the same encoding mode.

The video decoding device 200 may obtain information about at least one coding unit that generates the minimum encoding error when encoding is recursively performed for each maximum coding unit, and may use the information to decode the current picture. In other words, the coding units having a tree structure and determined to be the optimum coding units in each maximum coding unit may be decoded. Also, the maximum size of coding unit is determined by considering a resolution and amount of image data.

Accordingly, even if image data has a very high resolution and is excessively large, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
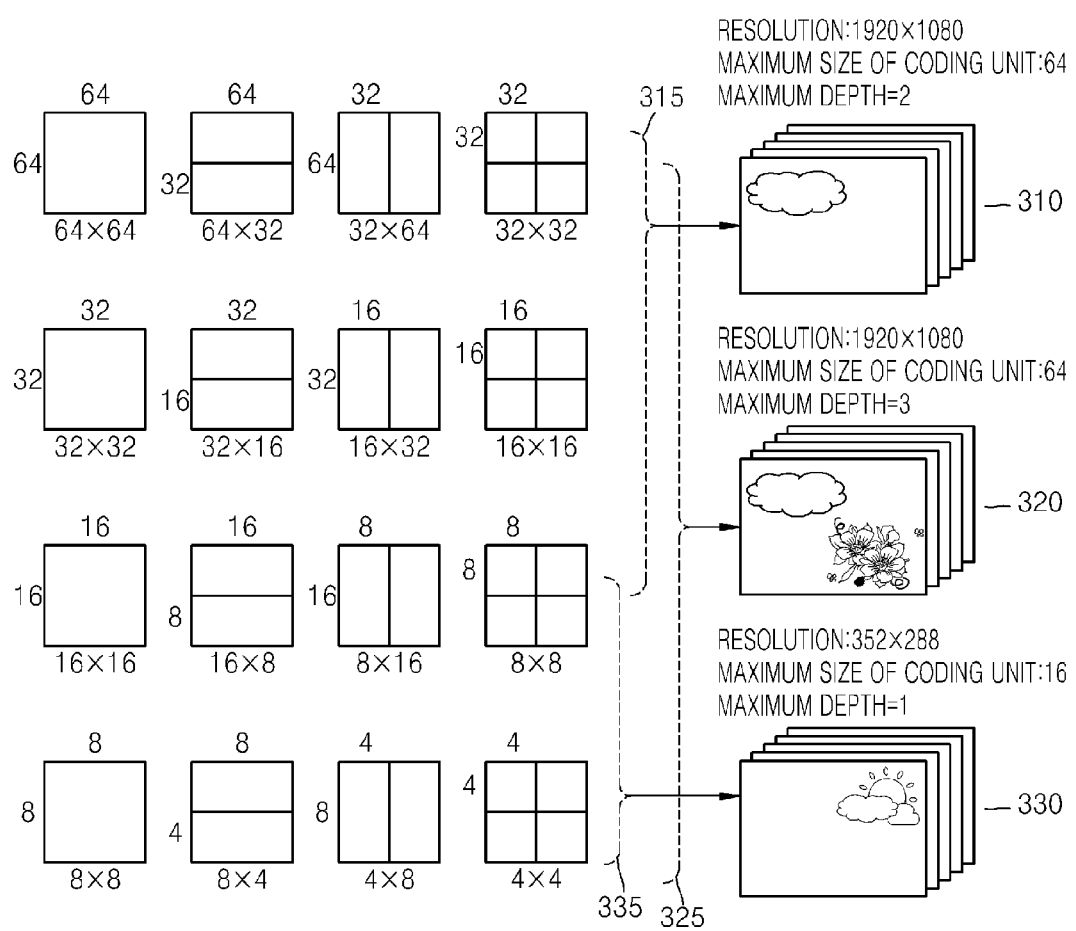
FIG. 3 illustrates a concept of coding units according to an exemplary embodiment.

FIG. 3 illustrates a concept of coding units according to an exemplary embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth increases, detailed information may be precisely expressed.

Figure 4:
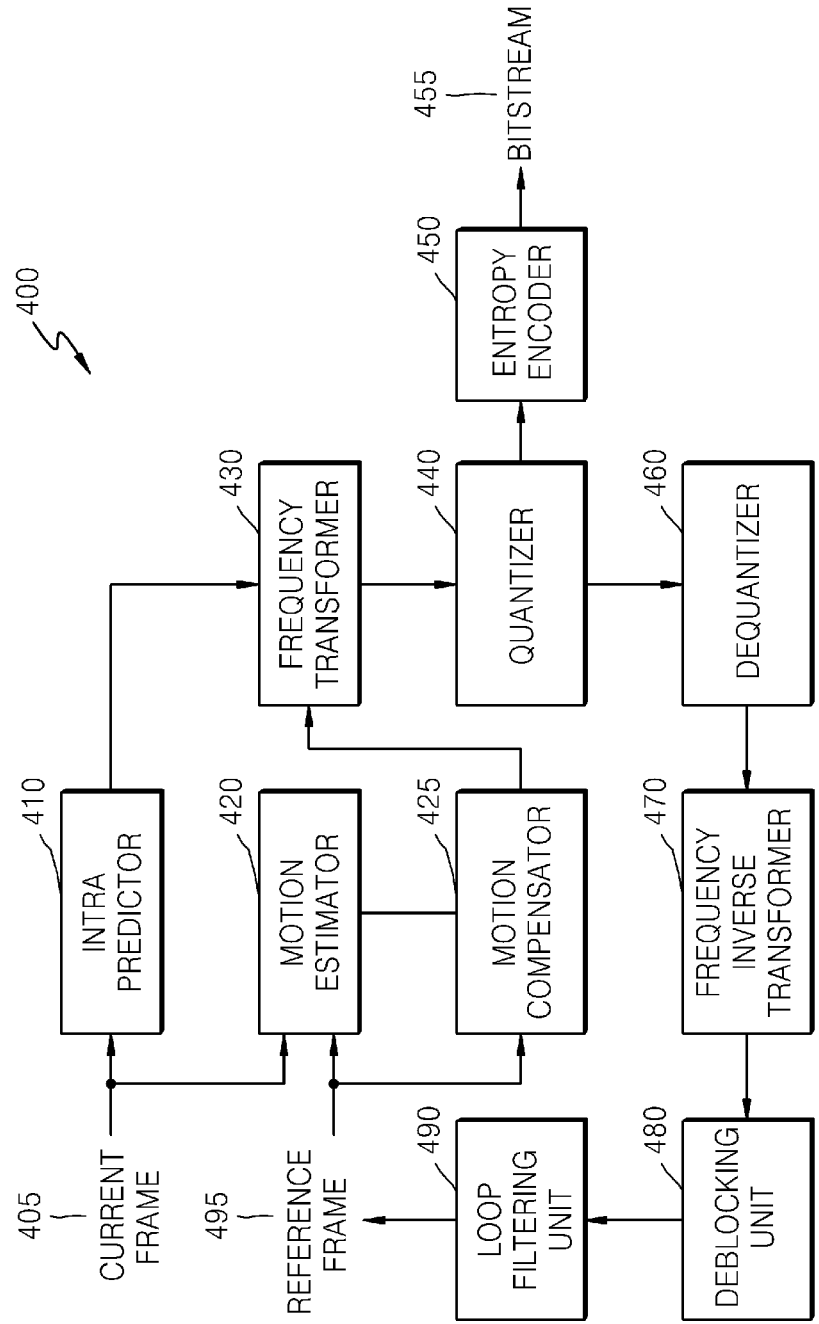
FIG. 4 is a block diagram of an image encoder based on coding units, according to an exemplary embodiment.

FIG. 4 is a block diagram of an image encoder based on coding units, according to an exemplary embodiment.

An image encoder 400 according to an exemplary embodiment performs operations of the coding unit determiner 120 of the video encoding device 100 to encode image data. In other words, an intra predictor 410 performs intra prediction on coding units in an intra mode, from among a current frame 405, and a motion estimator 420 and a motion compensator 425 perform inter prediction and motion compensation on coding units in an inter mode from among the current frame 405 by using the current frame 405 and a reference frame 495 in the inter more.

Data output from the intra predictor 410, the motion estimator 420, and the motion compensator 425 is output as a quantized transformation coefficient through a frequency transformer 430 and a quantizer 440. The quantized transformation coefficient is restored as data in the spatial domain through an inverse quantizer 460 and an inverse frequency transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order to use the image encoder 400 in the video encoding device 100, all elements of the image encoder 400, that is, the intra predictor 410, the motion estimator 420, the motion compensator 425, the frequency transformer 430, the quantizer 440, the entropy encoder 450, the inverse quantizer 460, the inverse frequency transformer 470, the deblocking unit 480, and the loop filtering unit 490, perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the frequency transformer 430 determines the size of the transformation unit in each coding unit from among the coding units having a tree structure.

Figure 5:
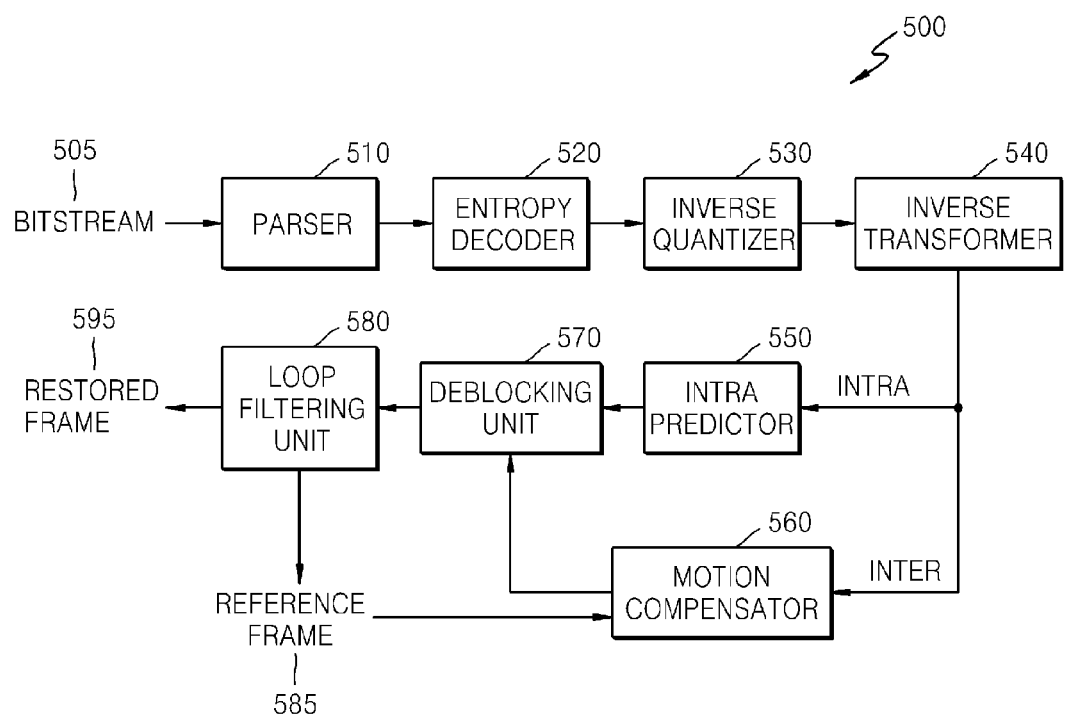
FIG. 5 is a block diagram of an image decoder based on coding units, according to an exemplary embodiment.

FIG. 5 is a block diagram of an image decoder based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse frequency transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data, which is post-processed through the deblocking unit 570 and the loop filtering unit 580, may be output as the reference frame 585.

In order to decode the image data in the image data decoder 230 of the video decoding device 200, operations that are performed after operations of the parser 510 of an image decoder 500 according to an exemplary embodiment may be performed.

In order for the image decoder 500 to be applied in the video decoding device 200, all elements of the image decoder 500, that is, the parser 510, the entropy decoder 520, the inverse quantizer 530, the inverse frequency transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 perform operations based on partitions and a prediction mode for each of the coding units having a tree structure, and the inverse frequency transformer 540 perform operations based on a size of a transformation unit for each coding unit.

Figure 6:
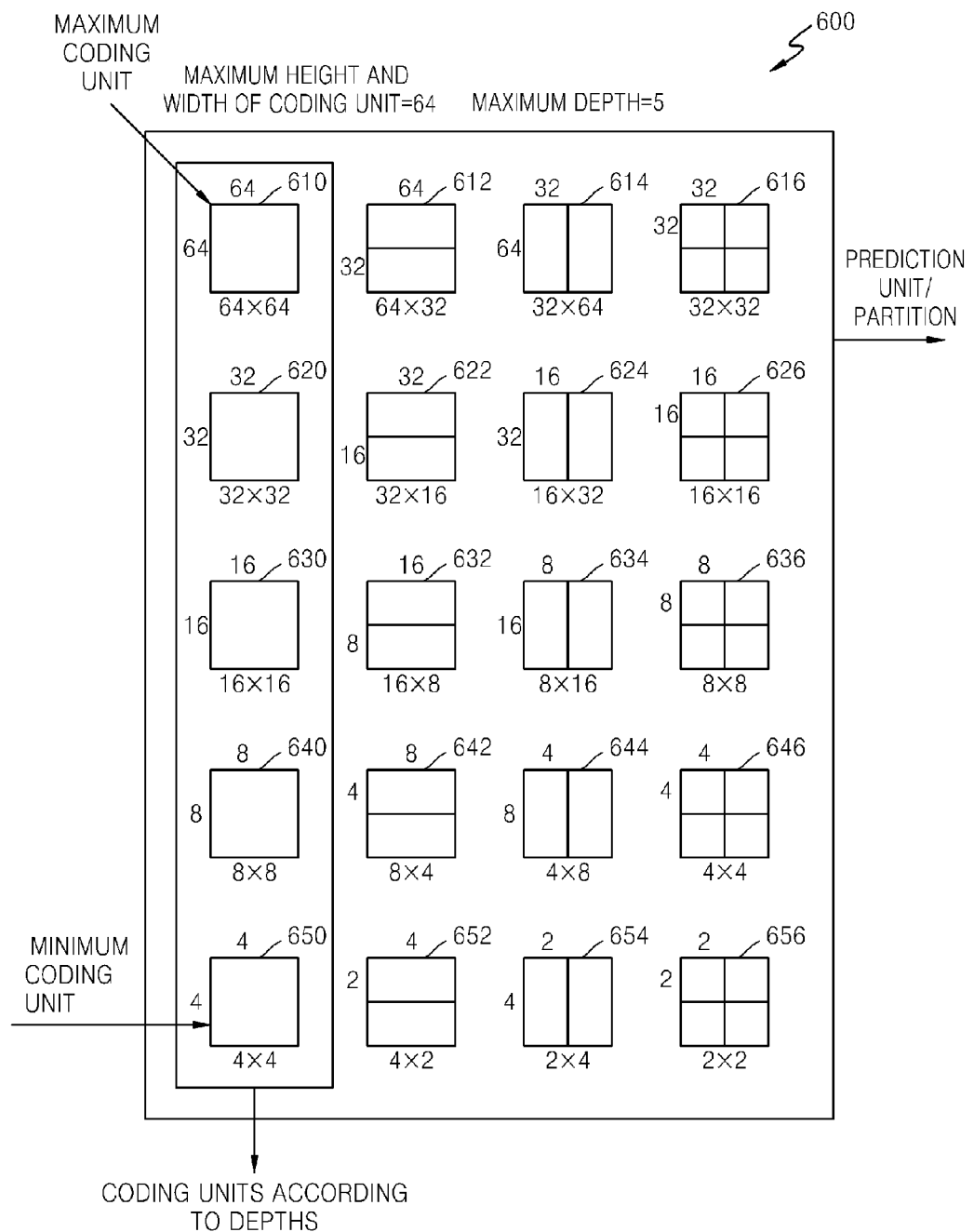
FIG. 6 illustrates deeper coding units according to depths and partitions, according to an exemplary embodiment.

FIG. 6 illustrates deeper coding units according to depths, and partitions, according to an exemplary embodiment.

The video encoding device 100 according to an exemplary embodiment and the video decoding device 200 according to an exemplary embodiment use coding unit having a hierarchical structures so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, in which a depth is 0 and a size, that is, a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the coding unit 610, that is a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, that is a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, that is a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, that is a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding device 100 performs encoding for coding units corresponding to each depth included in the maximum coding unit 610.

The number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths and performing encoding for each depth as the depth deepens along the vertical axis of the hierarchical structure 600. A depth and a partition having the minimum encoding error in the coding unit 610 may be selected as the coded depth and a partition type of the coding unit 610.

Figure 7:
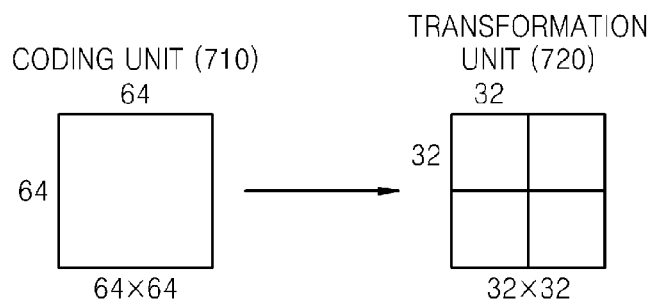
FIG. 7 illustrates a relationship between a coding unit and a transformation unit, according to an exemplary embodiment.

FIG. 7 illustrates a relationship between a coding unit and transformation units, according to an exemplary embodiment.

The video encoding device 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding device 100 according to an exemplary embodiment or the video encoding device 200 according to an exemplary embodiment, if a size of coding unit 710 is 64×64, transformation may be performed by using transformation units 720 having a size of 32×32.

Also, data of the coding unit 710 having the size of 64×64 may be encoded by performing the frequency transformation on each of the transformation units having the size of 32×32, 16×16, 8×8, and 4×4, which are smaller than 64×64, and then a transformation unit having the least coding error may be selected.

Figure 8:
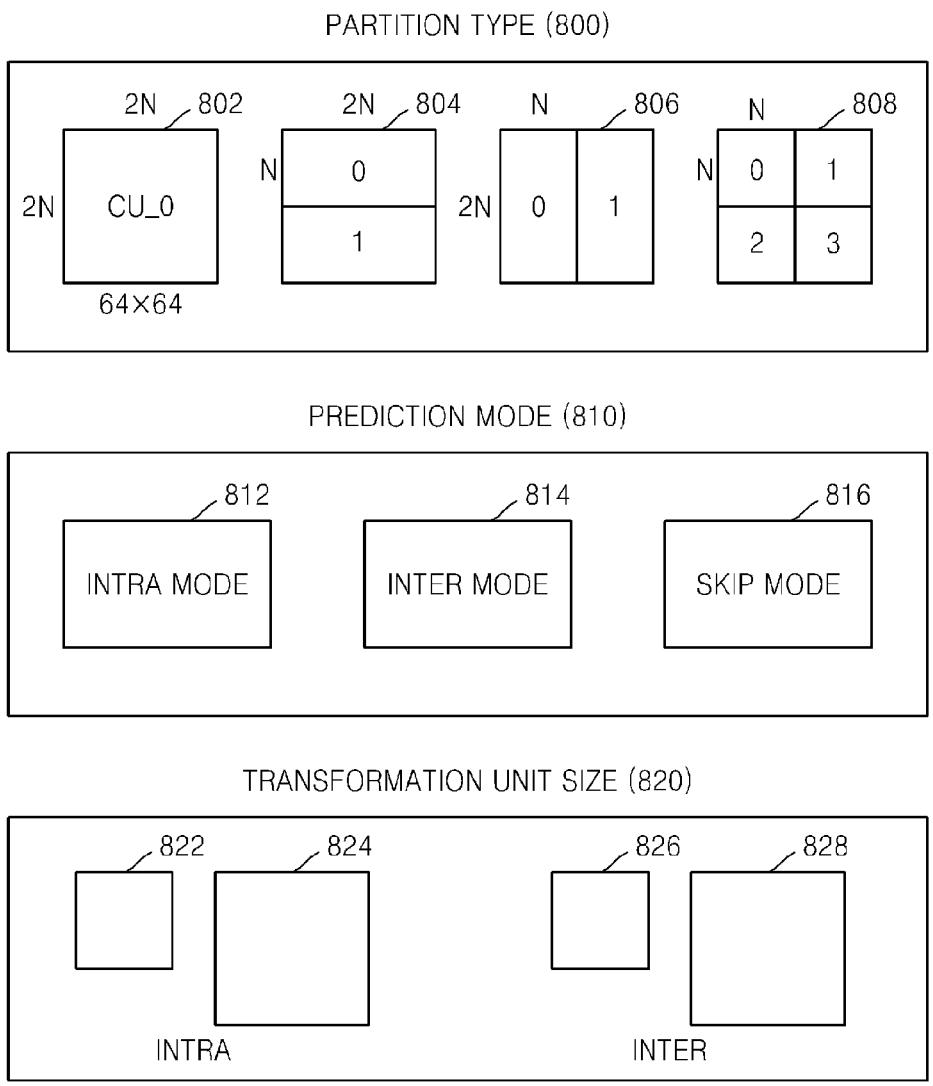
FIG. 8 illustrates encoding information according to depths, according to an exemplary embodiment.

FIG. 8 illustrates encoding information of coding units corresponding to a coded depth, according to an exemplary embodiment.

The output unit 130 of the video encoding device 100 according to an exemplary embodiment may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, that is, an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

Figure 9:
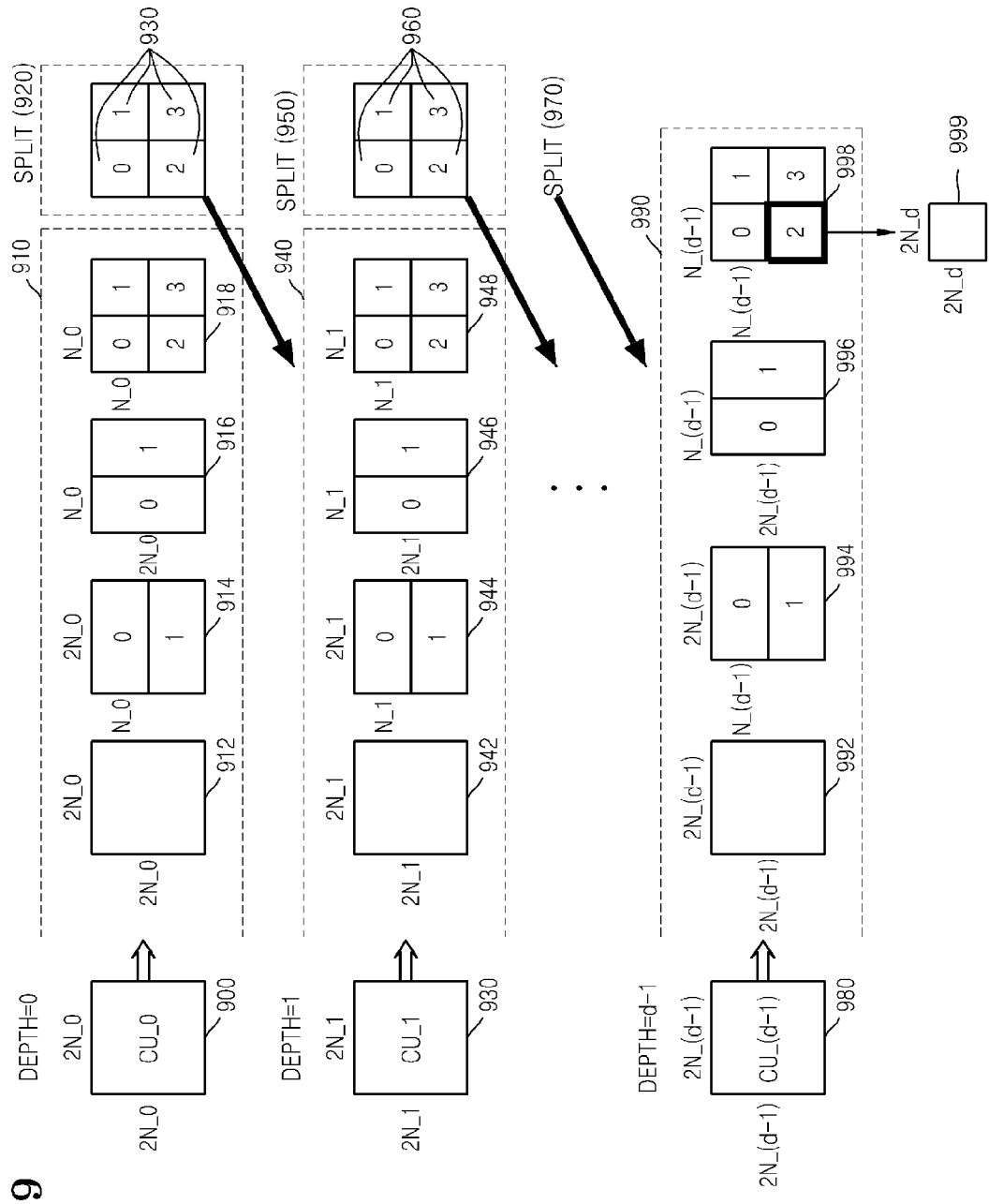
FIG. 9 illustrates deeper coding units according to depths, according to an exemplary embodiment.

The image data and encoding information extractor 220 of the video decoding device 200 according to an exemplary embodiment may extract and use the information 800 about a partition type, the information 810 about a prediction mode, and the information 820 about a size of a transformation unit for decoding, according to each deeper coding unit FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include a partition type 912 having a size of 2N_0×2N_0, a partition type 914 having a size of 2N_0×N_0, a partition type 916 having a size of N_0×2N_0, and a partition type 918 having a size of N_0×N_0. Although only the partition types 912, 914, 916, and 918 which are obtained by symmetrically splitting the prediction unit 910 are illustrated, a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an inter mode may be performed on the partitions having the sizes of 2N_0×2N_0, N_0×2N_0, 2N_0×N_0, and N_0×N_0, or the prediction encoding in an intra mode may be performed on the partitions having the sizes of 2N_0×2N_0 and N_0×N_0. The prediction encoding in a skip mode is performed only on the partition having the size of 2N_0×2N_0.

If an encoding error is smallest in one of the partition types 912, 914, and 916 respectively having the sizes of 2N_0×2N_0, 2N_0×N_0, and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on coding units 960, which have a depth of 2 and a size of N_2×N_2, to search for a minimum encoding error.

When a maximum depth is d, split information according to each depth may be set up to when a depth becomes d−1, and split information may be set up to when a depth becomes d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a "minimum unit" for the current maximum coding unit. A minimum unit according to an exemplary embodiment may be a square data unit obtained by splitting a minimum coding unit 980 by 4. By performing the encoding repeatedly, the video encoding device 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding device 200 may extract and use the information about the coded depth and the prediction unit of the coding unit 900 to decode the partition 912. The video decoding device 200 may determine a depth at which split information is 0 as a coded depth by using split information according to depths, and use information about an encoding mode of the corresponding depth for decoding.

Figure 10:
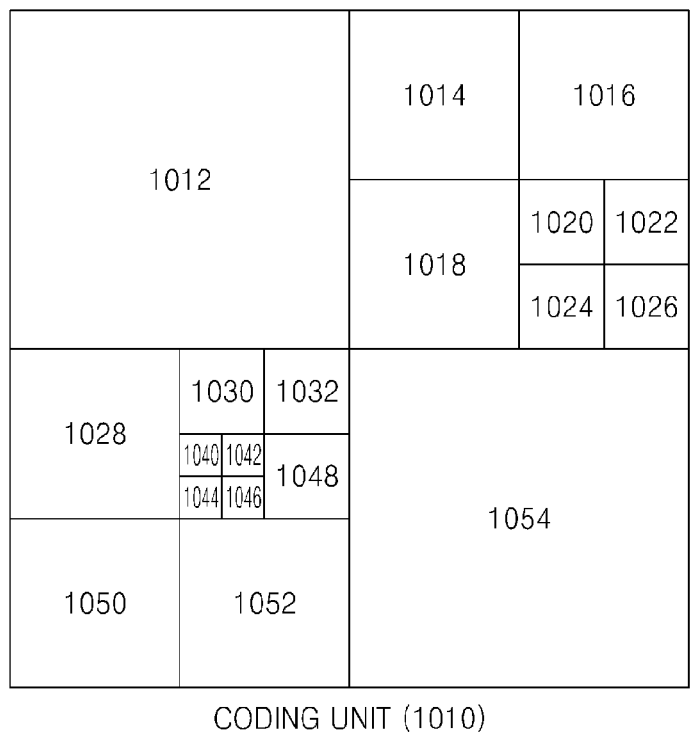
FIGS. 10, 11, and 12 are diagrams for describing a relationship between coding units, prediction units, and transformation units, according to an exemplary embodiment.
Figure 11:
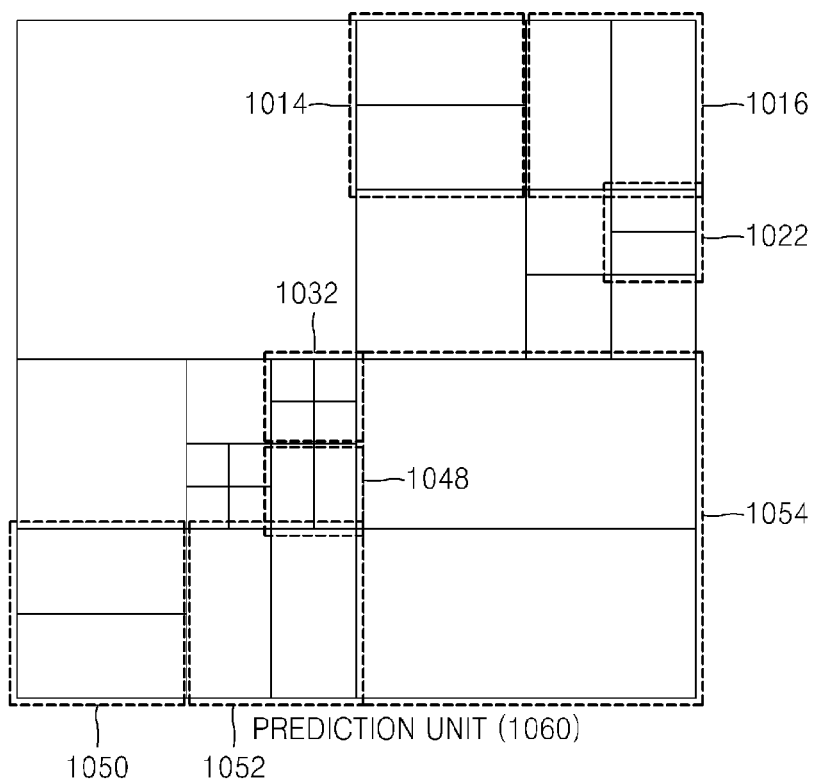
Figure 12:
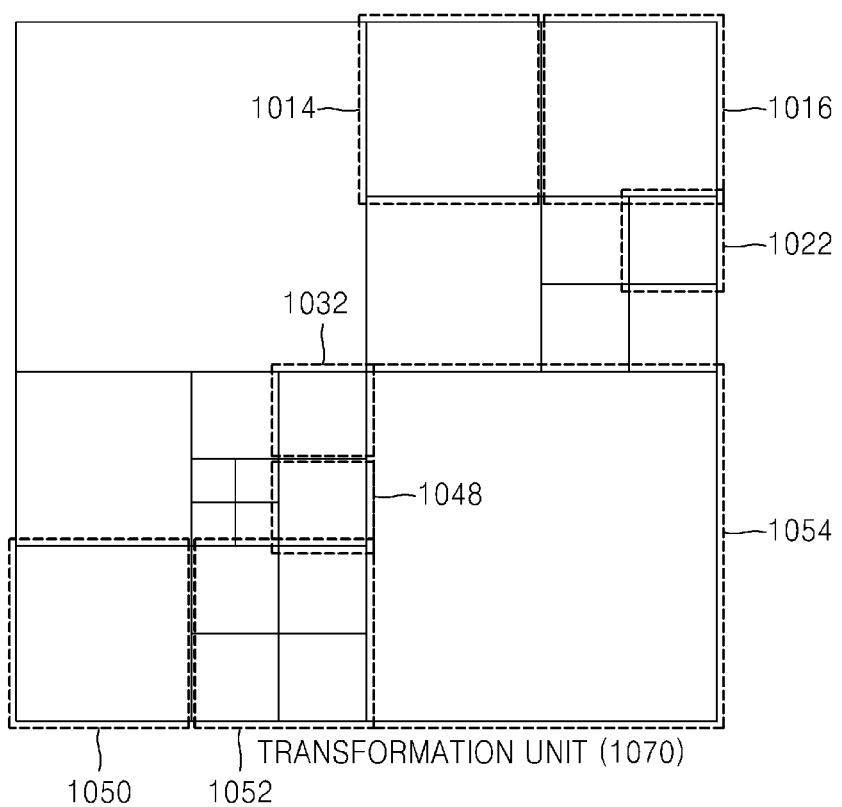

FIGS. 10, 11, and 12 are diagrams for describing a relationship between coding units, prediction units, and transformation units, according to an exemplary embodiment.

Coding units 1010 are coding units having a tree structure, corresponding to coded depths determined by the video encoding device 100, in a maximum coding unit. Prediction units 1060 are partitions of prediction units of each of the coding units 1010, and transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding devices 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding devices 100 and 200.

splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encoding for Each Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding device 100 may output the encoding information about the coding units having a tree structure, and the image data and encoding information extractor 220 of the video decoding device 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined for all partition types, and the skip mode is defined only for a partition type having a size of 2N×2N.

The information about the partition type may indicate symmetrical partition types having sizes of 2N×2N, 2N×N, N×2N, and N×N, which are obtained by symmetrically Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, in this case, if a current coding unit is predicted based on encoding information of adjacent data units, encoding information of data units in deeper coding units adjacent to the current coding unit may be directly referred to and used.

Alternatively, in another exemplary embodiment, if a current coding unit is predicted based on encoding information of adjacent data units, data units adjacent to the current coding unit are searched using encoded information of the data units, and the searched adjacent coding units may be referred to for predicting the current coding unit.

Figure 13:
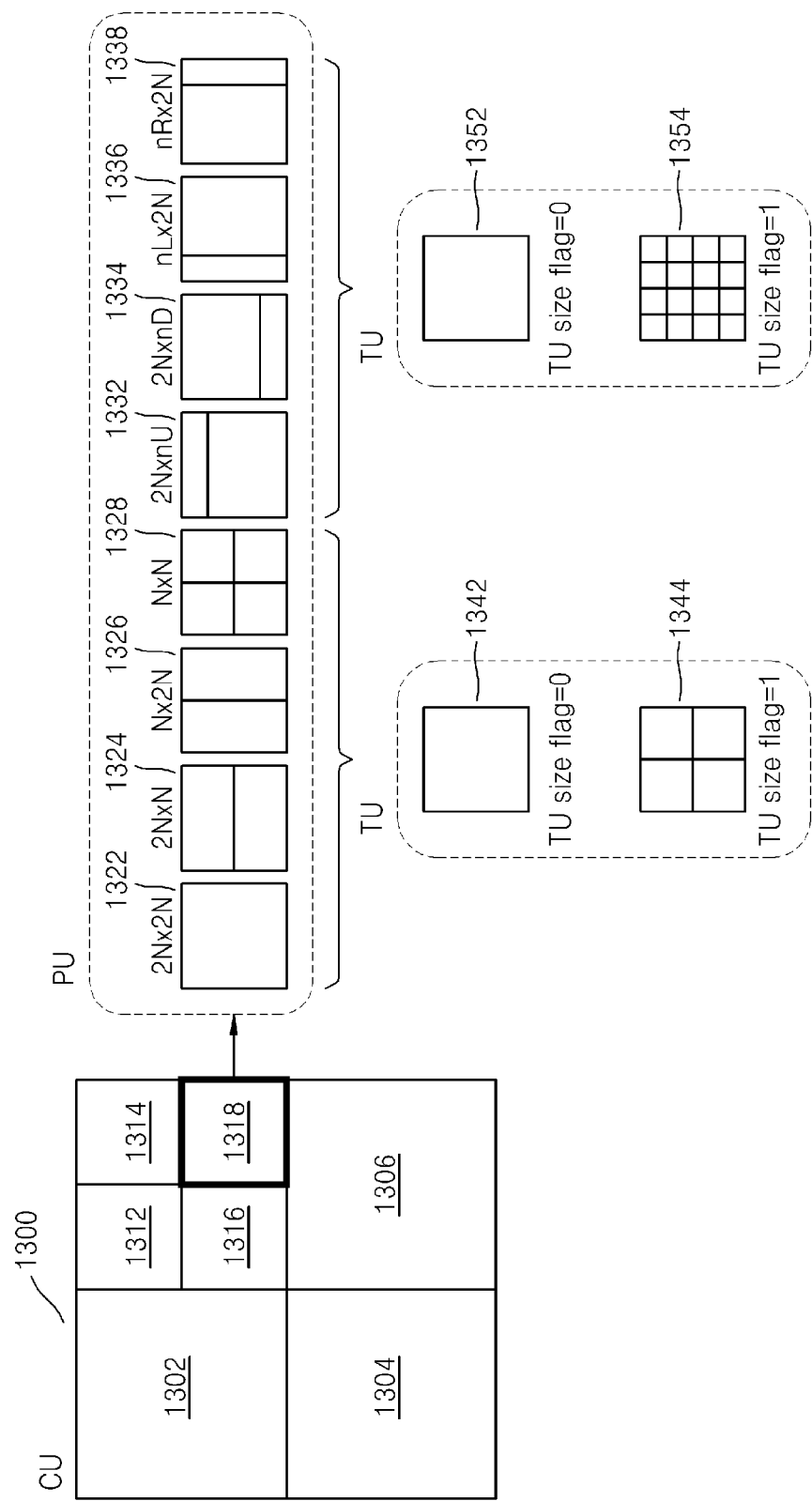
FIG. 13 illustrates a relationship between a coding unit, a prediction unit, and a transformation unit, according to encoding mode information of Table 1.

FIG. 13 illustrates a relationship between a coding unit, a prediction unit or a partition, and a transformation unit, according to the encoding mode information of Table 1.

A maximum coding unit 1300 includes coding units 1302, 1304, 1306, 1312, 1314, 1316, and 1318 of coded depths.

Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type information is set to be one of the symmetrical partition types 1322 (2N×2N), 1324 (2N×N), 1326 (N×2N), or 1328 (N×N), a transformation unit 1342 having a size of 2N×2N may be set if split information "TU size flag" of a transformation unit is 0, and a transformation unit 1344 having a size of N×N may be set if a TU size flag is 1.

When the partition type information is set to be one of the asymmetrical partition types 1332 (2N×nU), 1334 (2N×nD), 1336 (nL×2N), and 1338 (nR×2N), a transformation unit 1352 having a size of 2N×2N is set if the TU size flag is 0, and a transformation unit 1354 having a size of N/2×N/2 is set if the TU size flag is 1.

The intra prediction performed by the intra predictor 410 of the image encoder 400 of FIG. 4 and the intra predictor 550 of the image decoder 500 of FIG. 5 will be explained in detail.

Figure 14:
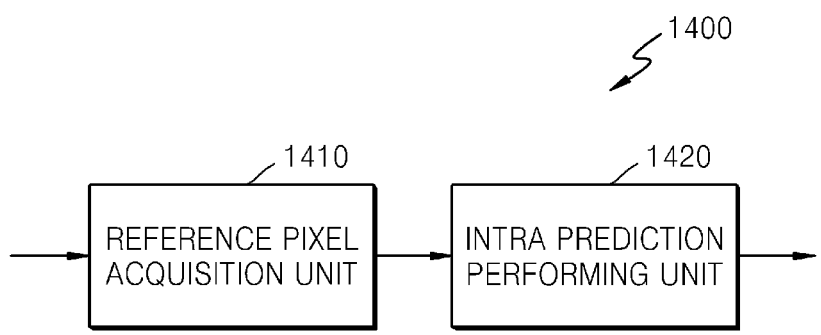
FIG. 14 is a block diagram of an intra prediction device according to an exemplary embodiment.

FIG. 14 is a block diagram of an intra prediction device according to an exemplary embodiment. An intra prediction device 1400 of FIG. 14 corresponds to the intra predictor 410 of FIG. 4 and the intra predictor 550 of FIG. 5.

Referring to FIG. 14, the intra prediction device 1400 includes a reference pixel acquisition unit 1410 (e.g., reference pixel acquirer), and an intra prediction performing unit 1420 (e.g., intra prediction performer). The reference pixel acquisition unit 1410 obtains a reference pixel used for intra prediction of each of a plurality of adjacent blocks by using pixels of peripheral blocks processed prior to the adjacent blocks. As described below, the reference pixel acquisition unit 1410 provides the reference pixels to perform intra prediction in parallel on the adjacent blocks by sharing pixels of peripheral blocks that are processed prior to the adjacent blocks, or obtaining the peripheral pixels needed for intra prediction of the adjacent blocks through extrapolation using the pixels of the previously processed peripheral blocks.

The intra prediction performing unit 1420 performs intra prediction in parallel on a plurality of adjacent blocks by using the obtained reference pixels. The intra prediction performing unit 1420 may additionally perform an intra prediction mode having various directivities by using (dx, dy) parameters, in addition to the intra prediction mode having a limited directivity according to the related art. In an example, when a size of a prediction unit that is intra predicted is N×N, the intra prediction performing unit 1420 may perform intra prediction by applying 35 intra prediction modes to each of blocks having seizes of 4×4, 8×8, 16×16, 32×32, and 64×64. The 35 intra prediction modes may include a planar mode, a DC mode, and intra prediction modes having 33 directivities. The number of intra prediction modes is not limited thereto and may be diversely set according to whether a current block is a chroma component or a luminance component, or according to information about a size of a current block, etc.

Figure 15:
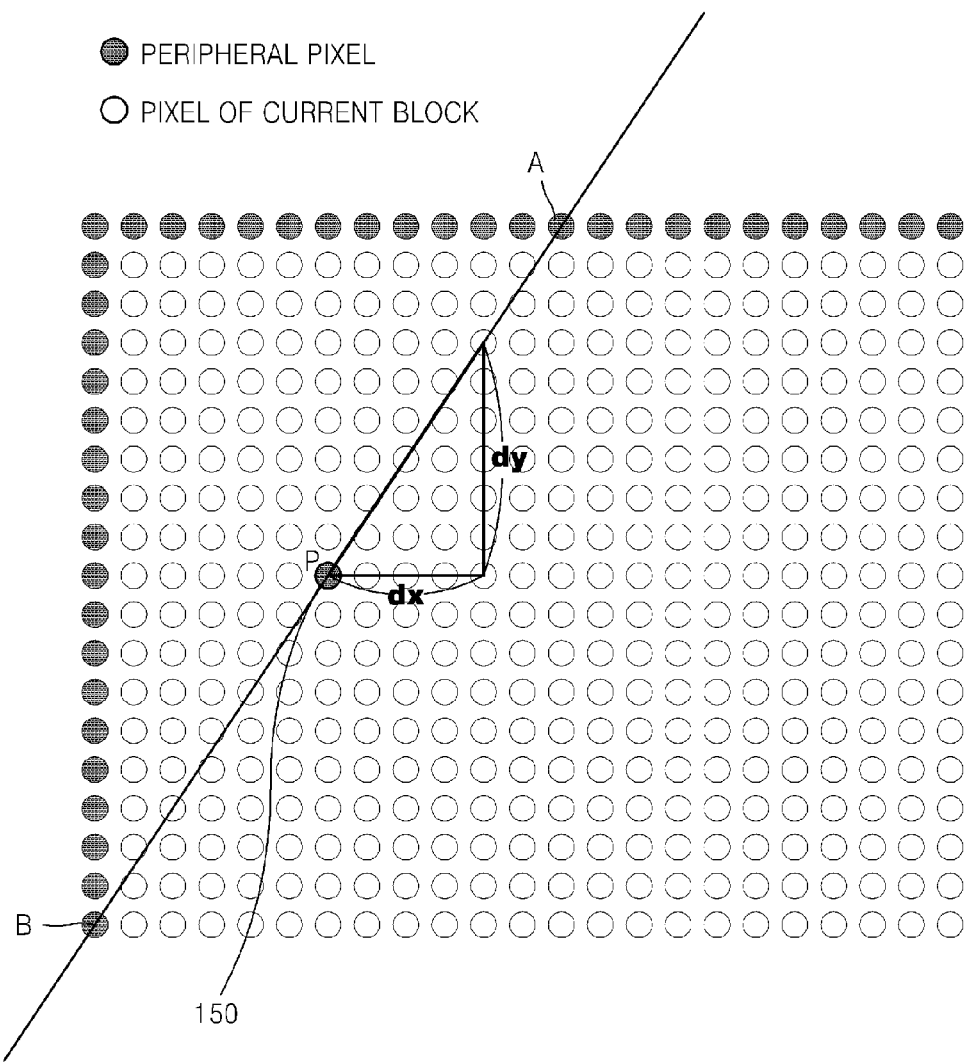
FIG. 15 is a reference view for explaining intra prediction modes having various directivities, according to an exemplary embodiment.

FIG. 15 is a reference view for describing intra prediction modes having various directivities according to an exemplary embodiment.

The intra prediction modes having various directivities may be set by determining peripheral reference pixels by using a line having a predetermined inclination with respect to a predicted pixel in a block and using the determined peripheral reference pixels as a predictor. The inclination of the line may be set by using the (dx, dy) parameters, where dx and dy are integers.

Referring to FIG. 15, peripheral pixels A and B located on an extension line 150 having an angle of $\tan^{-1}(dy/dx)$ that is determined by the value of (dx, dy) with respect to a predicted pixel P in a block may be used as predictors of the pixel P. Considering the angle of the extension line 150 that is determined according to the value of (dx, dy), the peripheral pixels used as predictors may be pixels included in peripheral blocks at the upper, left, upper right, and lower left sides of the current block.

In FIG. 15, when a predictor of the current pixel P is generated by using peripheral pixels located on or adjacent to the extension line 150, the extension line 150 has a directivity of $\tan^{-1}(dy/dx)$. Since a dividing operation of (dy/dx) is needed to determine the peripheral pixels by using the extension line 150, the amount of calculation may be increased due to a decimal point calculation when the dividing operation is performed by hardware or software. Accordingly, when a prediction direction to select a reference pixel is set by using the (dx, dy) parameters, dx and dy need to be set so as to decrease the amount of calculation.

Figure 16:
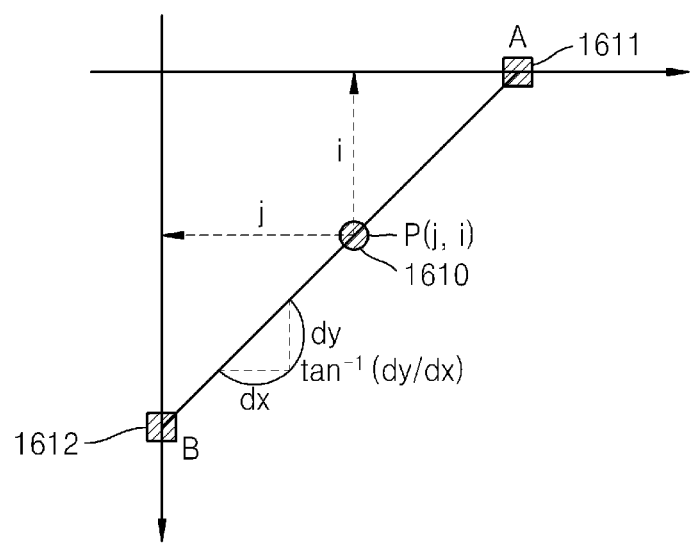
FIG. 16 is a diagram for explaining a relationship between a current pixel and peripheral pixels located on an extension line having a directivity (dx, dy), according to an exemplary embodiment.

FIG. 16 is a diagram for explaining a relationship between a current pixel and peripheral pixels located on an extension line having a directivity (dx, dy), according to an exemplary embodiment.

Referring to FIG. 16, a current pixel located at (j, i) is defined to be a pixel P 1610, and an upper peripheral pixel and a left peripheral pixel located on an extension line having a directivity, that is, an inclination, of $\tan^{-1}(dy/dx)$ passing through the current pixel P 1610 are defined to be a pixel A 1611 and a pixel B 1612, respectively. It is assumed that the size of a block including the current pixel P 1610 is nS×nS, where nS is a positive integer, the position of each pixel of the block is one of (0,0) to (nS−1, nS−1), and the position of an upper peripheral pixel located on an X axis is (m, −1), where m is an integer and the position of a left peripheral pixel located on a Y axis is (−1, n), where n is an integer. The position of the upper peripheral pixel A 1611 and the left peripheral pixel B 1612, which intersect the extension line passing through the current pixel P 1610, are (j+i*dx/dy, −1) and (−1, i+j*dy/dx), respectively. Accordingly, in order to predict the current pixel P 1610, a dividing operation such as dx/dy or dy/dx is needed to determine the upper peripheral pixel A 1611 or the left peripheral pixel B 1612. As described above, since operation complexity of the dividing operation is high, an operation speed may be lowered during the exemplary embodiment in software or hardware. Accordingly, at least one value of dx and dy indicating a directivity of a prediction mode to determine a peripheral pixel may be determined to be an exponentiation of 2. In other words, assuming n and m are integers, dx and dy may be respectively $2^n$ and $2^m$.

When the left peripheral pixel B 1612 is used as a predictor of the current pixel P 1610 and dx has a value of $2^n$, the operation of j*dy/dx that is needed to determine the position (−1, i+j*dy/dx) of the left peripheral pixel B 1612 is (i*dy)/($2^n$). Since the operation of dividing by a power of 2 may be embodied by a shift operation such as (i*dy)>>n, the amount of operation decreases. Similarly, when the upper peripheral pixel A 1611 is used as a predictor of the current pixel P 1610 and dy has a value of $2^m$, the operation of i*dx/dy that is needed to determine the position (j+i*dx/dy, −1) of the upper peripheral pixel A 1611 is (i*dx)/(2^m). The operation of dividing by an exponent of 2 may be embodied by a shift operation such as (i*dx)>>m.

Tables 2 to 4 show the (dx, dy) parameters where at least one of a value dx or dy is set to be an exponent of 2.

TABLE 2

| dx  | Dy | dx | dy  | dx | dy |
|-----|----|----|-----|----|----|
| −32 | 32 | 21 | 32  | 32 | 13 |
| −26 | 32 | 26 | 32  | 32 | 17 |
| −21 | 32 | 32 | 32  | 32 | 21 |
| −17 | 32 | 32 | −26 | 32 | 26 |
| −13 | 32 | 32 | −21 | 32 | 32 |
| −9  | 32 | 32 | −17 |    |    |
| −5  | 32 | 32 | −13 |    |    |
| −2  | 32 | 32 | −9  |    |    |
| 0   | 32 | 32 | −5  |    |    |
| 2   | 32 | 32 | −2  |    |    |
| 5   | 32 | 32 | 0   |    |    |
| 9   | 32 | 32 | 2   |    |    |
| 13  | 32 | 32 | 5   |    |    |
| 17  | 32 | 32 | 9   |    |    |

TABLE 3

| dx  | Dy | dx | dy  | dx | dy |
|-----|----|----|-----|----|----|
| −32 | 32 | 19 | 32  | 32 | 10 |
| −25 | 32 | 25 | 32  | 32 | 14 |
| −19 | 32 | 32 | 32  | 32 | 19 |
| −14 | 32 | 32 | −25 | 32 | 25 |
| −10 | 32 | 32 | −19 | 32 | 32 |
| −6  | 32 | 32 | −14 |    |    |
| −3  | 32 | 32 | −10 |    |    |
| −1  | 32 | 32 | −6  |    |    |
| 0   | 32 | 32 | −3  |    |    |
| 1   | 32 | 32 | −1  |    |    |
| 3   | 32 | 32 | 0   |    |    |
| 6   | 32 | 32 | 1   |    |    |
| 10  | 32 | 32 | 3   |    |    |
| 14  | 32 | 32 | 6   |    |    |

TABLE 4

| dx  | Dy | dx | dy  | dx | dy |
|-----|----|----|-----|----|----|
| −32 | 32 | 23 | 32  | 32 | 15 |
| −27 | 32 | 27 | 32  | 32 | 19 |
| −23 | 32 | 32 | 32  | 32 | 23 |
| −19 | 32 | 32 | −27 | 32 | 27 |
| −15 | 32 | 32 | −23 | 32 | 32 |
| −11 | 32 | 32 | −19 |    |    |
| −7  | 32 | 32 | −15 |    |    |
| −3  | 32 | 32 | −11 |    |    |
| 0   | 32 | 32 | −7  |    |    |
| 3   | 32 | 32 | −3  |    |    |
| 7   | 32 | 32 | 0   |    |    |
| 11  | 32 | 32 | 3   |    |    |
| 15  | 32 | 32 | 7   |    |    |
| 19  | 32 | 32 | 11  |    |    |

As described above, each intra prediction mode using the (dx, dy) parameters uses the left peripheral pixel (−1, i+j*dy/dx) or the upper peripheral pixel (j+i*dx/dy, −1) as predictors of a pixel located at (j, i). When at least one of the values dx and dy has an exponent of 2 as shown in Tables 2 to 4 and the positions of the left peripheral pixel (−1, i+j*dy/dx) and the upper peripheral pixel (j+i*dx/dy, −1) may be obtained by only a multiplication and a shift operation without a dividing operation.

Figure 17:
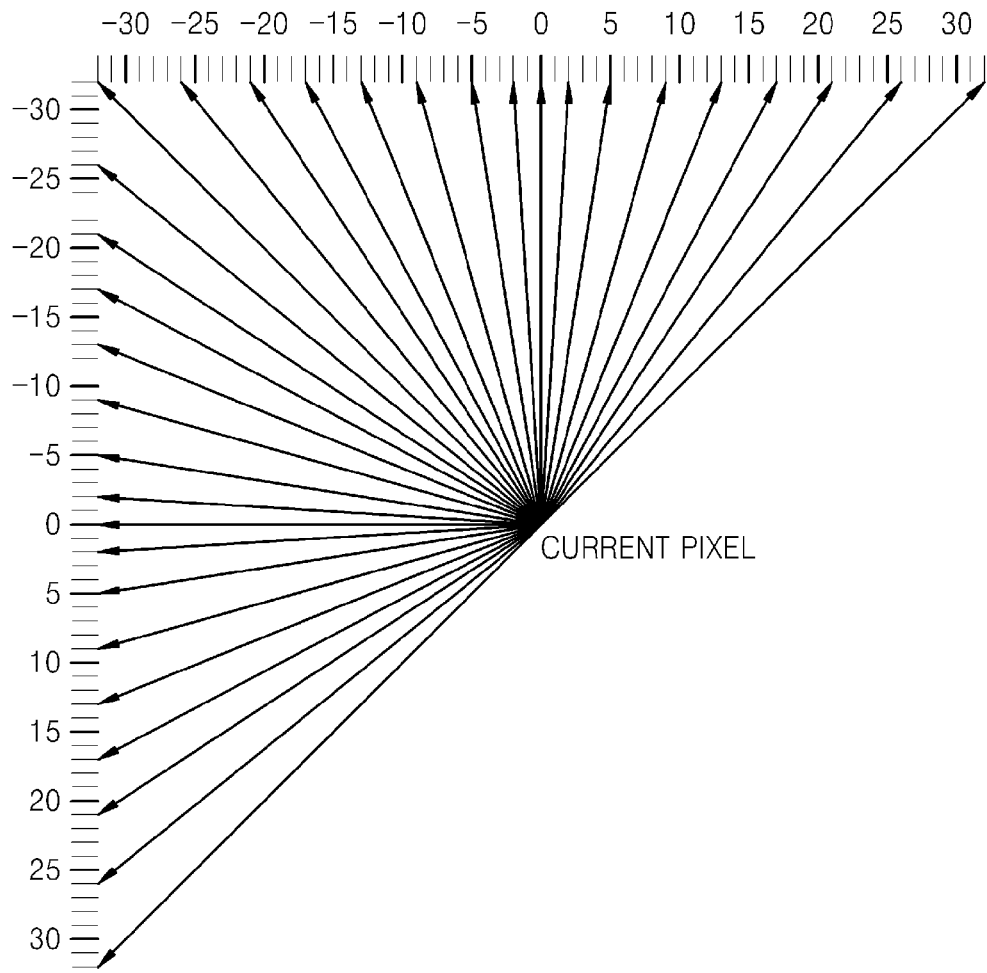
FIG. 17 illustrates directions of an intra prediction mode having 33 directivities, according to an exemplary embodiment.

FIG. 17 illustrates directions of an intra prediction mode having 33 directivities, according to an exemplary embodiment.

Referring to 17, the intra prediction performing unit 1420 may determine a peripheral pixel to be used as a predictor of a current pixel according to intra prediction modes having 33 directivities as illustrated in FIG. 17. In addition to the intra prediction mode having 33 directivities, the intra prediction performing unit 1420 may perform intra prediction by employing a planar mode, a DC mode, etc.

On the other hand, since pixels of adjacent peripheral blocks are used as reference pixels for intra prediction, the current block has a dependency on peripheral blocks so that the current block can be intra predicted only after the peripheral blocks is completed.

Figure 18A:
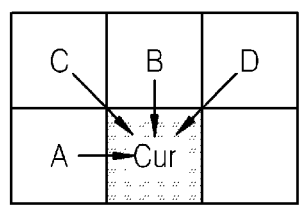
FIGS. 18A and 18B illustrate peripheral blocks needed when intra prediction is performed on a current block according to an exemplary embodiment.
Figure 18B:
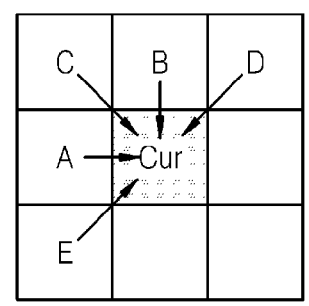

FIGS. 18A and 18B illustrate peripheral blocks needed when intra prediction is performed on a current block. FIG. 18A illustrates peripheral blocks needed for intra prediction of a current block according to a related art intra prediction mode used for H.264. FIG. 18B illustrates peripheral blocks needed for intra prediction of a current block according to intra prediction modes having various directivities according to an exemplary embodiment.

Referring to FIG. 18A, based on the related art intra prediction mode used for H.264, a left block A, an upper right block C, an upper block B, and an upper right block D of a current block Cur may be referred to during intra prediction of the current block Cur. Referring to FIG. 18B, as described above, a lower left block E may be additionally referred to when the current block Cur is predicted according to an exemplary embodiment having various directivities by using the (dx, dy) parameters. Since the intra prediction is performed by using the pixels of the previously processed peripheral block as reference pixels, the current block Cur and the peripheral blocks A to E may not be simultaneously processed in parallel. For example, when the current block Cur uses pixels of the upper block B as reference pixels, the intra prediction of the current block Cur may be performed only after the processing of the upper block B is completed. Also, the current block Cur and the upper block B may be simultaneously processed in parallel.

Accordingly, according to an exemplary embodiment, in order to intra predict a plurality of adjacent blocks in parallel, the intra prediction device 1400 shares pixels of previous blocks that are encoded and restored prior to the adjacent blocks, as reference pixels, or uses reference pixels generated through extrapolation.

Figure 19:
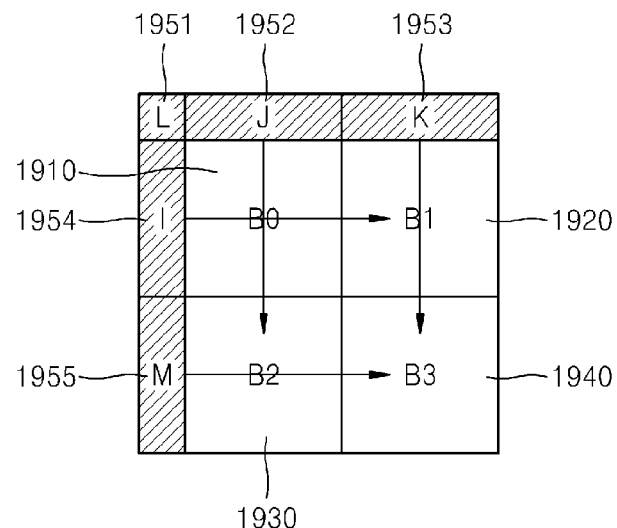
FIG. 19 is a reference view for explaining a process of acquiring reference pixels to perform parallel intra prediction of a plurality of adjacent blocks, according to an exemplary embodiment.

FIG. 19 is a reference view for explaining a process of acquiring reference pixels to process parallel intra prediction of a plurality of adjacent blocks, according to an exemplary embodiment.

Referring to FIG. 19, the reference pixel acquisition unit 1410 obtains reference pixels needed for intra prediction of respective adjacent blocks B0 to B3 to process parallel intra prediction of four (4) adjacent blocks B0 to B3. A hatched area in FIG. 19 is assumed to be pixels of peripheral blocks that are encoded and restored prior to the four (4) adjacent blocks B0 to B3.

The reference pixel acquisition unit 1410 uses pixels I, J, K, L, and M 1951 to 1955 of the initial peripheral blocks as reference pixels used for intra prediction of the block B0 1910. Since the peripheral pixels I, J, K, L, and M 1951 to 1955 are pixels that are encoded and restored prior to the block B0 1910, the peripheral pixels I, J, K, L, and M 1951 to 1955 may be used as reference pixels of the block B0 1910. The peripheral pixel K 1953 may be used as an upper peripheral pixel that is used for intra prediction of the block B1 1920. However, since the left peripheral pixel used for the intra prediction of the block B1 1920 is included in the block B0 1910 that is intra predicted in parallel with the block B1 1920, the left peripheral pixel may not be used as a reference pixel for the intra prediction of the block B1 1920. Accordingly, the reference pixel acquisition unit 1410 determines the peripheral pixel I 1954 at the left side of the block B0 1910 that is the closest available peripheral pixel to the block B1 1920 in the left direction, as the left peripheral pixel for the intra prediction of the block B1 1920.

The peripheral pixel M 1955 may be used as the left peripheral pixel for intra prediction of the block B2 1930. Since an upper peripheral pixel used for the intra prediction of the block B2 1930 is included in the block B0 1910 that is intra predicted in parallel with the block B2 1930, the upper peripheral pixel may not be used as a reference pixel for the intra prediction of the block B2 1930. Accordingly, the reference pixel acquisition unit 1410 determines the peripheral pixel J 1952 at the upper side of the block B0 1930 that is the closest available peripheral pixel to the block B2 1930 in the upward direction, as the upper peripheral pixel for the intra prediction of the block B2 1930.

Since both the upper and left peripheral pixels for intra prediction of the block B3 1940 are included in the block B1 1920 and the block B2 1930, respectively, which are intra predicted in parallel with the block B3 1940, the upper and left peripheral pixels may not be used as reference pixels for the intra prediction of the block B3 1940. Accordingly, the reference pixel acquisition unit 1410 determines the peripheral pixel K 1953 at the upper side of the block B1 1920 that is the closest available peripheral pixel to the block B3 1940 in the upward direction, as the upper peripheral pixel for the intra prediction of the block B 1940, and the peripheral pixel M 1955 at the left side of the block B2 1930 that is the closest available peripheral pixel to the block B3 1940 in the left direction, as the left peripheral pixel for the intra prediction of the block B 1940.

As such, the reference pixel acquisition unit 1410 shares the peripheral pixels, which are encoded and restored prior to the adjacent blocks, and uses the peripheral pixels as reference pixels, and thus the parallel intra prediction process may be performed on the adjacent blocks.

Figure 20:
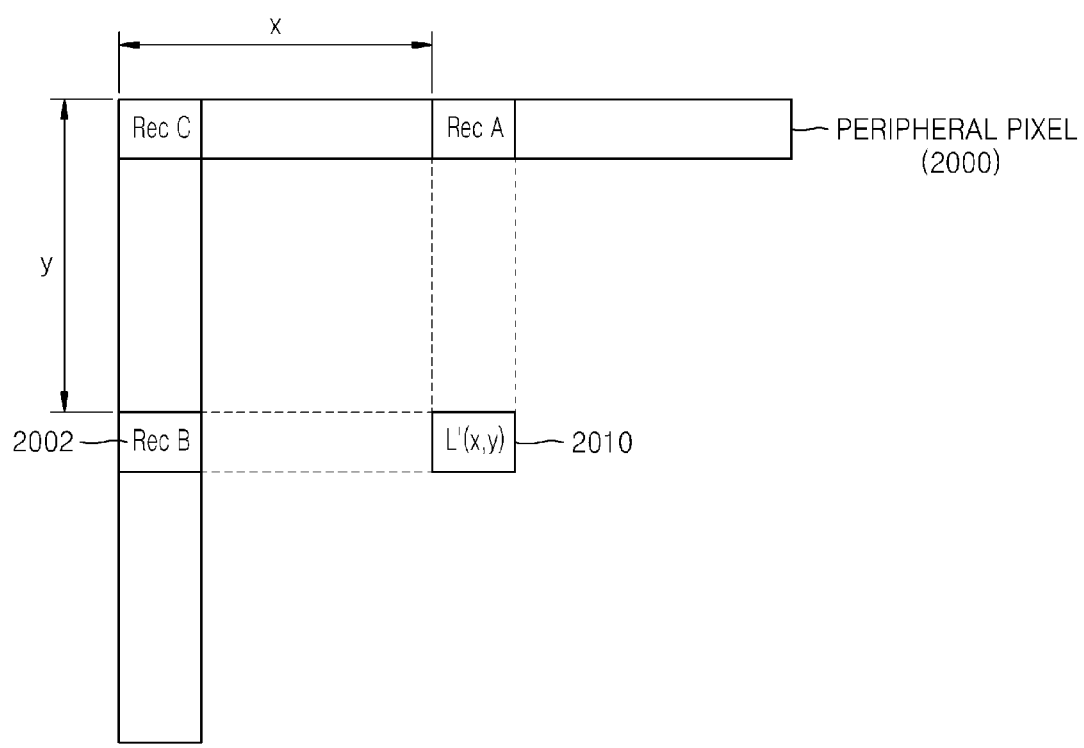
FIG. 20 is a reference view for explaining a process of acquiring reference pixels to perform parallel intra prediction of a plurality of adjacent blocks, according to another exemplary embodiment.

FIG. 20 is a reference view for explaining a process of acquiring reference pixels to perform parallel intra prediction on a plurality of adjacent blocks, according to another exemplary embodiment.

Instead of using the peripheral pixels that are encoded and restored prior to the adjacent blocks, the reference pixel acquisition unit 1410 may obtain reference pixels needed for intra prediction of the adjacent blocks through extrapolation using the encoded and restored peripheral pixels.

Referring to FIG. 20, assuming that a reference pixel needed for intra prediction of a plurality of adjacent blocks is L'(x, y) 2010, the reference pixel acquisition unit 1410 obtains the reference pixel L'(x, y) 2010 through extrapolation using a peripheral pixel RecA 2001 located in the same column as the reference pixel L'(x, y) 2010, a peripheral pixel RecB 2002 located in the same row as the reference pixel L'(x, y) 2010, and a peripheral pixel RecC 2003 located at the upper right corner, among available peripheral pixels 2000. As an example, the reference pixel acquisition unit 1410 obtains the reference pixel L'(x, y) 2010 according to any one of equations: L'(x, y)={RecA+RecB}/2 (average of peripheral pixels), L'(x, y)={RecA*y+RecB*x}/(x+y) (geometric average of peripheral pixels considering distance), L'(x, y)={RecB+(RecC−RecA)/x} (average considering a change rate of peripheral pixels in a horizontal direction), L'(x, y)={RecA+(RecC−RecB)/y} (average considering a change rate of peripheral pixels in a horizontal direction). The method of acquiring the reference pixel L'(x, y) is not limited thereto and may be one of a variety of methods based on available peripheral pixels.

Figure 21:
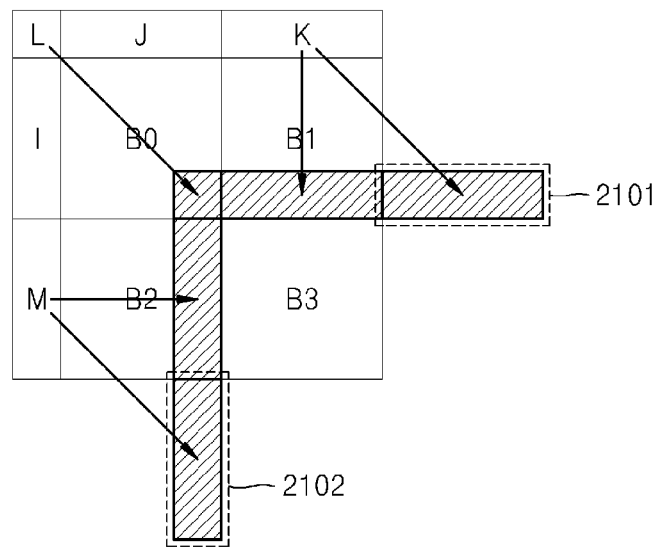
FIG. 21 illustrates an example of a process of acquiring upper right and upper left reference pixels, according to an exemplary embodiment.

FIG. 21 illustrates an example of a process of acquiring upper right and upper left reference pixels, according to an exemplary embodiment.

As described above, according to an exemplary embodiment, since the intra prediction device 1400 performs intra prediction by employing intra prediction modes having various directivities, a peripheral pixel at the upper right of a block and a peripheral pixel at the upper left side of the block are needed. Referring to FIG. 21, it is assumed that such reference pixels as hatched areas are needed for intra prediction of a block B3. In this case, as described above, a peripheral pixel 2101 at the upper right side of the block B3 may be obtained by using an extended peripheral pixel K located at the upper side of a block B1 or through extrapolation using available peripheral pixels. Similarly, a peripheral pixel 2102 at the left side of the block B3 may be obtained by using a peripheral pixel M located at the left side of a block B2, or through extrapolation using other available peripheral pixels.

As described above, according to an exemplary embodiment, the intra prediction device 1400 obtains reference pixels needed for the respective adjacent blocks by using peripheral blocks that is processed prior to the adjacent blocks and performs parallel intra prediction on each of the adjacent blocks by using the obtained reference pixels, and thus an intra prediction processing speed may be improved. Also, according to an exemplary embodiment, the intra prediction device 1400 may process parallel intra prediction by sharing pixels of the adjacent blocks that are processed prior to the intra prediction of each block or by using pixels generated through extrapolation, without being limited to the above-described four (4) adjacent blocks of the upper left block, upper right block, lower left block, and lower right block of FIG. 19.

On the other hand, reference pixel syntax information "IntraRef_neighibor_dependency flag" may be set in units of predetermined data to indicate whether pixels of the previously processed peripheral blocks according to an exemplary embodiment are used as reference pixels for parallel intra prediction of the adjacent blocks. For example, when IntraRef_negihbor_dependency flag=1, the parallel prediction method according to an exemplary embodiment is being performed. When IntraRef_neighbor_dependency flag=0, intra prediction according to an intra prediction method of the related art is being performed. The entropy decoder 450 may add the reference pixel syntax information "IntraRef_neighbor_dependency flag" in units of sequences, pictures, and slices. In other words, the reference pixel syntax information "IntraRef_neighbor_dependency flag" may be added to a sequence parameter set (SPS), a picture parameter set (PPS), or a slice header.

Figure 22:
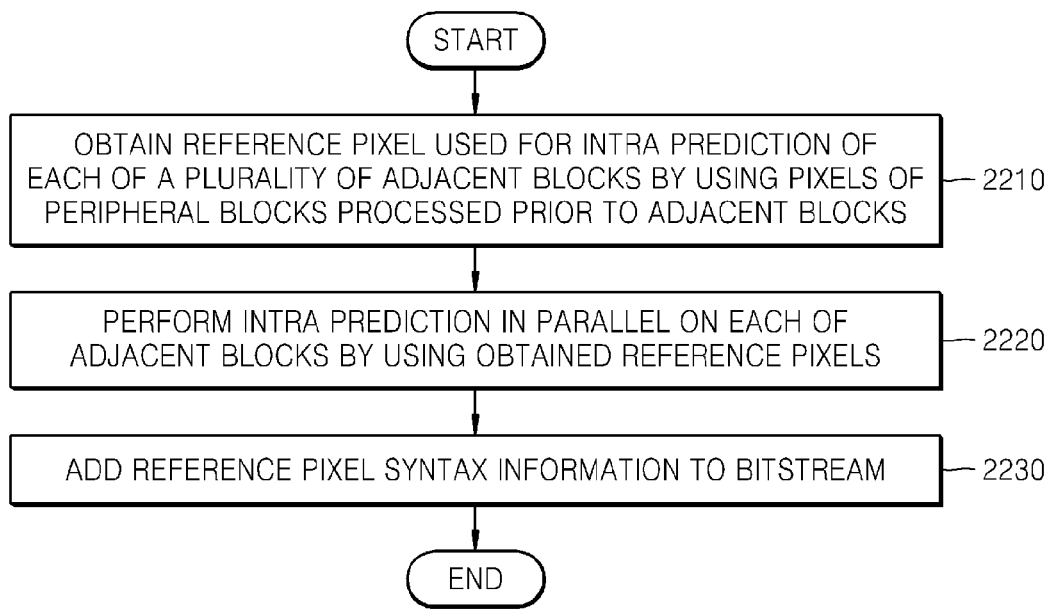
FIG. 22 is a flowchart illustrating a video encoding method to process parallel intra prediction, according an exemplary embodiment.

FIG. 22 is a flowchart illustrating a video encoding method to process parallel intra prediction, according an exemplary embodiment.

Referring to FIG. 22, in operation 2210, the reference pixel acquisition unit 1410 obtains a reference pixel used for intra prediction of each of a plurality of adjacent blocks by using pixels of peripheral blocks processed prior to the adjacent blocks. As described with reference to FIG. 19, the reference pixel acquisition unit 1410 obtains a reference pixel by using a pixel of the left peripheral block that is previously processed and close to the left side of the upper left block for the upper right block of the four (4) adjacent blocks, obtains the reference pixel by using a pixel of the upper peripheral block that is previously processed and close to the upper side of the upper left block for the lower left block, and obtains the reference pixel by using a pixel of the upper peripheral block that is previously processed and close to the upper side of the upper right block and a pixel of the left peripheral block that is previously processed and close to the left side of the lower left block for the lower left block. Also, the reference pixel acquisition unit 1410 may obtain a reference pixel through extrapolation using the pixels of the previously processed peripheral blocks.

In operation 2220, the intra prediction performing unit 1420 performs intra prediction in parallel on each of the adjacent blocks by using the obtained reference pixels. Since the reference pixels are obtained from the pixels of the previously processed peripheral blocks by removing a dependency between the adjacent blocks during intra prediction of each block, parallel processing of the adjacent blocks is available.

In operation 2230, the entropy decoder 450 adds to a bitstream reference pixel syntax information that indicates whether the pixels of the peripheral blocks processed prior to the adjacent blocks are used as reference pixels during intra prediction of each of the adjacent blocks. As described above, reference pixel syntax information "IntraRef_neighbor_dependency flag" may be added to the SPS, the PPS, or the slice header.

Figure 23:
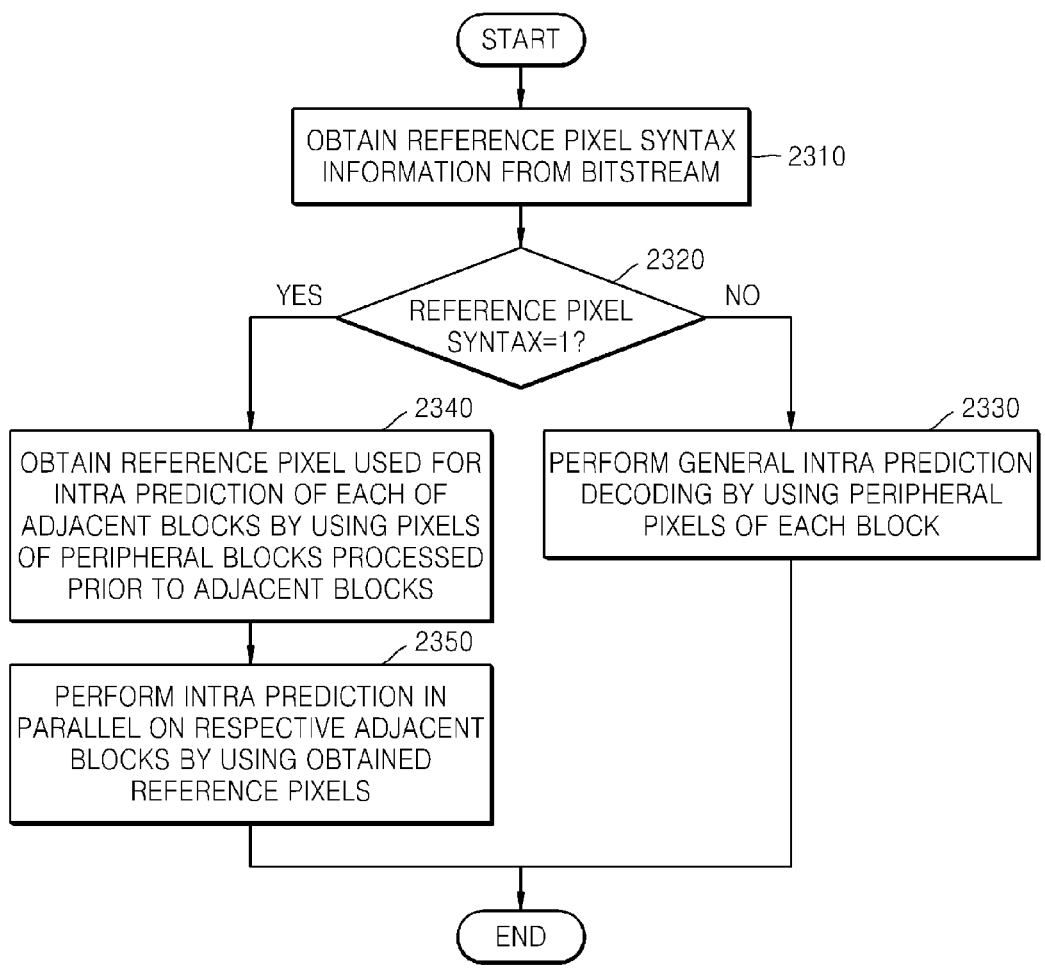
FIG. 23 is a flowchart illustrating a video decoding method to process parallel intra prediction, according an exemplary embodiment.

FIG. 23 is a flowchart illustrating a video decoding method to process parallel intra prediction, according an exemplary embodiment.

Referring to FIGS. 5 and 23, in operation 2310, the entropy decoder 520 obtains reference pixel syntax information "IntraRef_neighbor_dependency flag" indicating whether pixels of peripheral blocks processed prior to a plurality of adjacent blocks are used as reference pixels for intra prediction of each of the adjacent blocks.

In operation 2320, the intra predictor 550 determines based on the reference pixel syntax information "IntraRef_neighbor_dependency flag" whether the intra predicted blocks are blocks predicted by a parallel intra prediction method according to an exemplary embodiment. As described above, the reference pixel syntax information "IntraRef_neighbor_dependency flag" may be set in units of sequences, pictures, or slices. When IntraRef_neighbor_dependency flag=1, the intra predicted blocks included in the data unit may be decoded by the parallel intra prediction method according to an exemplary embodiment. When IntraRef_neighbor_dependency flag=0, the intra predicted blocks may be decoded by the intra prediction method of the related art.

In operation 2330, when reference pixel syntax information "IntraRef_neighbor_dependency flag" is 0, the intra predictor 550 generates prediction values of blocks by performing general intra prediction decoding of the related art. In other words, the intra predictor 550 performs intra prediction by using pixels of the peripheral blocks adjacent to the intra predicted blocks.

In operation 2340, when IntraRef_neghibor_dependency flag=1, the intra predictor 550 obtains a reference pixel used for intra prediction of each of the adjacent blocks by using the pixels of the peripheral blocks processed prior to the adjacent blocks according to an exemplary embodiment. As described above, the intra predictor 550 may use the peripheral pixels that are encoded prior to the adjacent blocks and then restored, or may obtain a reference pixel needed for intra prediction through extrapolation using the peripheral pixels that are previously encoded or restored.

In operation 2350, the intra predictor 550 performs intra prediction in parallel on the respective adjacent blocks by using the obtained reference pixels.

On the other hand, during intra prediction, dependency on the peripheral blocks increases as the size of a block decreases. Accordingly, performing intra prediction on a block having a size less than or equal to a predetermined size may be restricted according to another exemplary embodiment. For example, the intra predictors 410 and 550 may set the smallest size of a block to be intra predicted to 8×8 blocks and may restrict performing intra prediction on 4×4 blocks that are smaller than the 8×8 blocks. Information "Min_Intraprediction_size" about the smallest size of a block on which intra prediction is to be performed may be set in units of predetermined data. The entropy decoder 450 may add the information "Min_Intraprediction_size" about the smallest size of a block on which intra prediction is to be performed, to the SPS, the PPS, or the slice header. According to another exemplary embodiment, an intra prediction processing speed may be improved by restricting intra prediction on a small-sized block having a large dependency on the peripheral blocks and performing intra prediction only on a block having a relatively large size.

Figure 24:
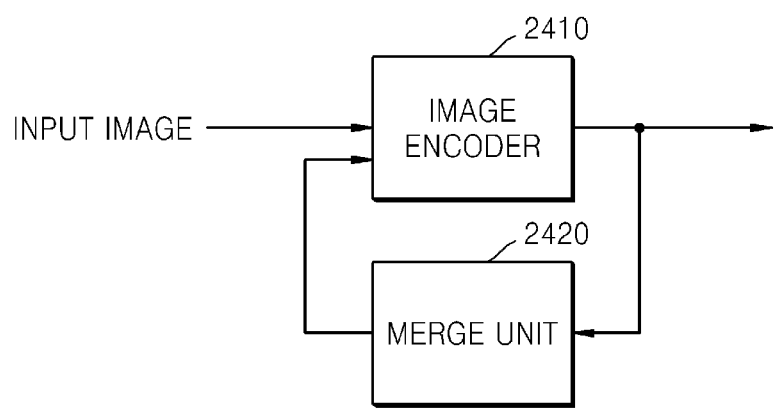
FIG. 24 is a block diagram of a video encoding device, according to another exemplary embodiment.

FIG. 24 is a block diagram of a video encoding device, according to another exemplary embodiment.

Referring to FIG. 24, a video encoding device 2400 may include an image encoder 2410 and a merge unit 2420.

The image encoder 2410 splits a picture by a maximum coding unit having the maximum size and splits the maximum coding unit into coding units having hierarchical structures for encoding the picture. In detail, the image encoder 2410 performs 2-pass encoding, that is, performs encoding two times. First, the image encoder 2410, like the above-described video encoding device 100 of FIG. 1, encodes image data by a deeper coding unit according to depths for each maximum coding unit of a current picture, selects a depth at which the smallest coding error occurs, and determines a selected depth as a coded depth, thereby determining the coding unit having a hierarchical structure, and then outputs a determined coded depth and image data for each maximum coding unit.

When a number Num_minCu of intra predicted coding units each having a size less than or equal to a predetermined critical size and included in coded image data exceeds a predetermined critical value Th_num, the merge unit 2420 merges intra predicted coding units having a size less than or equal to a predetermined critical size, which are adjacent to each other and included in the maximum coding unit, such that the number of intra predicted coding units having a size less than or equal to a predetermined critical size is less than or equal to the predetermined critical value Th_num. The image encoder 2410 performs prediction encoding again on a merged coding unit.

Figure 25:
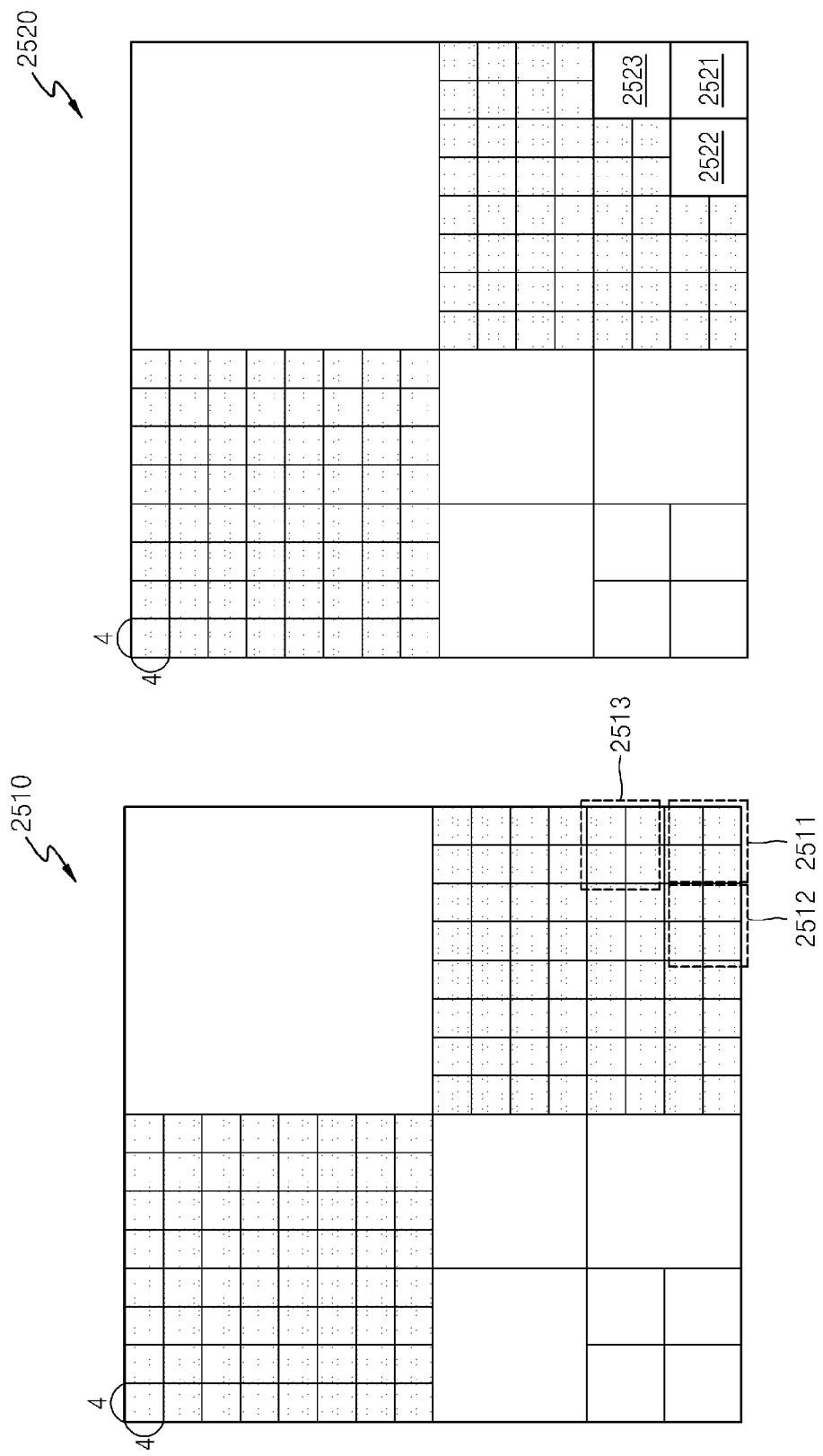
FIG. 25 illustrates a process of merging intra predicted coding units having sizes less than or equal to a predetermined critical size, in a video encoding device, according to another exemplary embodiment.

FIG. 25 illustrates a process of merging intra predicted coding units having a size less than or equal to a predetermined critical size, the process being performed in a video encoding device, according to another exemplary embodiment.

Referring to the left side of FIG. 25, it is assumed that the image encoder 2410 encodes image data by a deeper coding unit according to depths for each maximum coding unit of a current picture 2510, selects a depth at which the smallest coding error occurs, and determines a selected depth as a coded depth, thereby determining the coding unit having a hierarchical structure, and then outputs a determined coded depth and image data for each maximum coding unit. Also, it is assumed that a coding unit having a 4×4 size as illustrated is an intra predicted coding unit and a predetermined critical size is 4×4. A total of 128 intra predicted coding units having a 4×4 size are included in the current picture 2510. The merge unit 2420 merges intra predicted coding units having a size less than or equal to a 4×4 size such that the number of intra predicted coding units having a size less than or equal to a predetermined critical size, that is, intra predicted coding units having a size less than or equal to a 4×4 size, which are included in the current picture 2510, is less than or equal to a predetermined critical value. Assuming that the predetermined critical value is 118, the merge unit 2420 merges intra predicted coding units having a size less than or equal to a 4×4 size such that the number of intra predicted coding units having a size less than or equal to a 4×4 size, which are included in the current picture 2510, is less than or equal to 118. During merging, the intra predicted coding units having a size less than or equal to a 4×4 size, which are adjacent to each other and processed later than others, are merged. To make the number of intra predicted coding units having a size less than or equal to a 4×4 size to be less than or equal to 118, the merge unit 2420 merges intra predicted coding units 2511, 2512, and 2513, each having a size less than or equal to a 4×4 size and being located at positions to be processed later than others, into coding units 2521, 2522, and 2523, each having a size less than or equal to a 8×8 size, as illustrated in the right side of FIG. 25. Since a total of twelve (12) intra predicted coding units having a 4×4 size are removed through the above merger, the total number of the intra predicted coding units having a 4×4 size is 116 (=128−12) to be less than or equal to the predetermined critical value that is 118.

The image encoder 2410 performs re-encoding on a merged current picture 2520 including coding units in a new hierarchical structure obtained through the above merger. The image encoder 2410 may perform encoding again only on the coding units 2521, 2522, and 2523, each having a size less than or equal to an 8×8 size that is a merged coding unit. To prevent the coding units 2521, 2522, and 2523 having a 8×8 size and merged during the re-encoding from being split again, the image encoder 2410 may perform re-encoding in a state in which the size of the coding units 2521, 2522, and 2523 having an 8×8 size.

Figure 26:
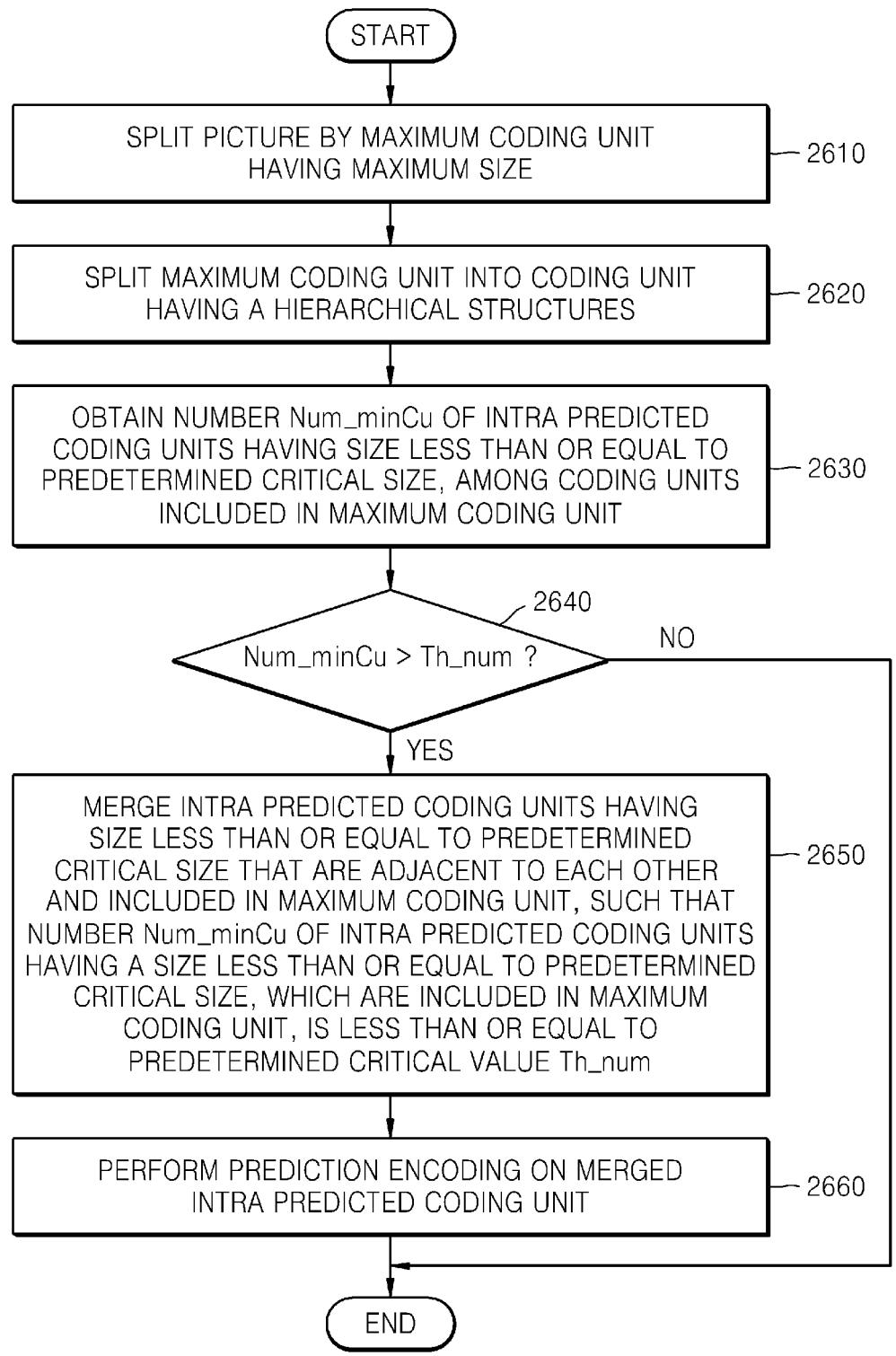
FIG. 26 is a flowchart for explaining a video decoding method, according to another exemplary embodiment.

FIG. 26 is a flowchart for explaining a video decoding method, according to another exemplary embodiment.

Referring to FIG. 26, in operation 2610, the image encoder 2410 splits a picture by a maximum coding unit having a maximum size. In operation 2620, the image encoder 2410 encodes the maximum coding unit by splitting the maximum coding unit into coding units having a hierarchical structure. As described above, the image encoder 2410 encodes image data by a deeper coding unit according to depths for each maximum coding unit, selects a depth at which the smallest coding error occurs, and determines a selected depth as a coded depth, thereby determining a coding unit having a hierarchical structure, and then outputs a determined coded depth and image data for each maximum coding unit.

In operation 2630, the merge unit 2420 obtains, from among the encoded coding units included in the maximum coding unit, the number Num_minCu of intra predicted coding units having a size less than or equal to a predetermined critical size. In operation 2640, the merge unit 2420 determines whether the number Num_minCu of intra predicted coding units having a size less than or equal to a predetermined critical size exceeds a predetermined critical value Th_num. As a result of the operation 2640, when the number Num_minCu of intra predicted coding units having a size less than or equal to a predetermined critical size exceeds the predetermined critical value Th_num, in operation 2650, the merge unit 2420 merges intra predicted coding units having a size less than or equal to a predetermined critical size that are adjacent to each other and included in the maximum coding unit, such that the number Num_minCu of intra predicted coding units having a size less than or equal to a predetermined critical size, which are included in the maximum coding unit, is less than or equal to the predetermined critical value Th_num. As described above, the intra predicted coding units having a size less than or equal to a predetermined critical size that are adjacent to each other and processed later than others are merged. In operation 2660, the image encoder 2410 performs prediction encoding again on the merged coding unit.

According to another exemplary embodiment, since the number of intra prediction blocks having a small size to increase data dependency between blocks is limited to be less than or equal to a predetermined number, degradation of image quality is prevented and fast image encoding is available.

The bitstream that is encoded by the video encoding method according to another exemplary embodiment may be decoded through the image decoder 500 of FIG. 5 like the bitstream encoded by the image encoder 400 of FIG. 4.

Figure 27:
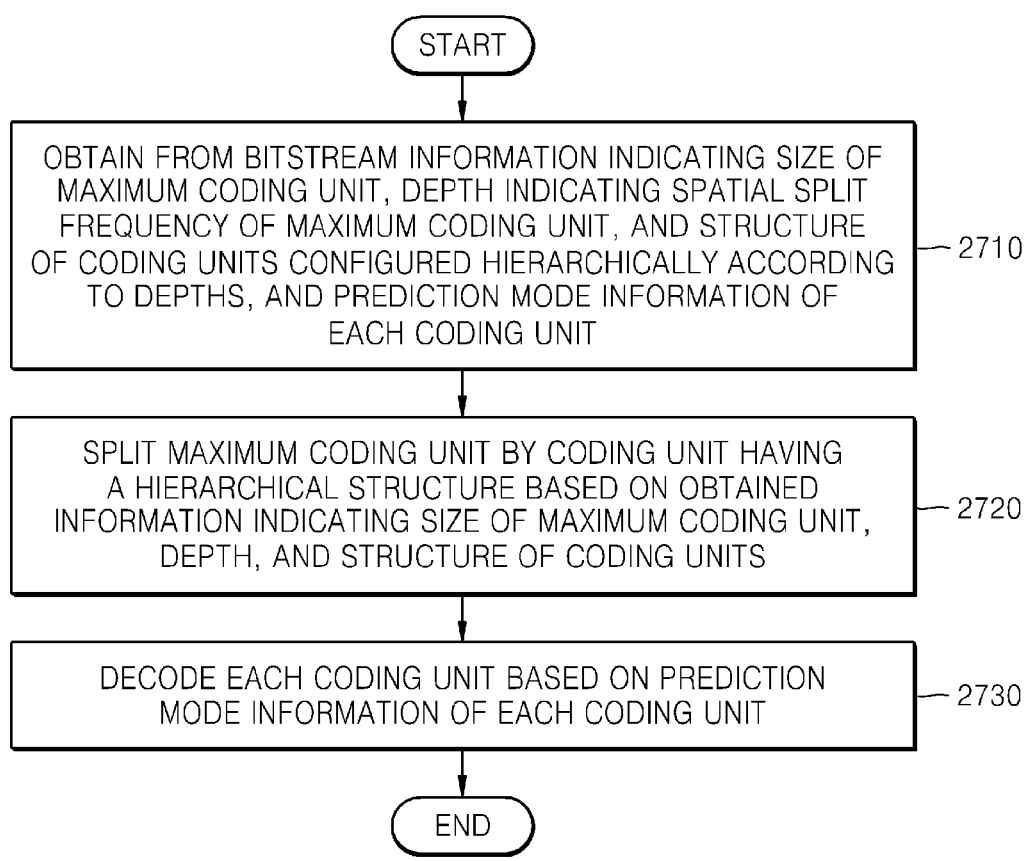
FIG. 27 is a flowchart for explaining a video decoding method, according to another exemplary embodiment.

FIG. 27 is a flowchart for explaining a video decoding method, according to another exemplary embodiment.

Referring to FIGS. 5 and 27, in operation 2710, the entropy decoder 520 obtains information indicating the size of the maximum coding unit, a depth indicating the spatial split frequency of the maximum coding unit, the structure of coding units configured hierarchically according to depths, and prediction mode information of each coding unit, from a bitstream.

In operation 2720, the entropy decoder 520 splits the maximum coding unit by the coding unit having a hierarchical structure based on the obtained information indicating the size of the maximum coding unit, the depth, and the structure of coding units.

In operation 2730, the intra predictor 550 or the motion compensator 560 obtains a prediction value of each coding unit by performing intra prediction or inter prediction according to the prediction mode information of each coding unit. The prediction value of each coding unit output from the intra predictor 550 or the motion compensator 560 is added to residual data obtained through the inverse quantizer 530 and the inverse frequency transformer 540 and each coding unit is decoded.

In the video encoding method according to another exemplary embodiment, since the number of reference pixels used for intra prediction of coding units included in the maximum coding unit is limited, the number of blocks to be intra predicted may be limited. For example, the video encoding device 2400 sums the number of reference pixels needed for intra prediction of coding units to be intra predicted which are included in the maximum coding unit, and when the number of reference pixels used for the intra prediction exceeds a predetermined critical value, encoding is performed based on other prediction mode except for an intra prediction mode on the intra predicted coding units that are processed later than others. Accordingly, the number of the intra predicted coding unit included in the maximum coding unit may be limited.

One or more exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), storage media, etc. Furthermore, it is understood that one or more of the above-described elements may be implemented in or by at least one processor including circuitry.

While exemplary embodiments have been particularly shown and described above, it will be understood by those of ordinary skill in the art that various changes in form and details may be made therein without departing from the spirit and scope of the invention as defined by the appended claims. Exemplary embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. A method of encoding a video to perform parallel intra prediction, the method comprising:
   obtaining, by using pixels of peripheral blocks that are processed prior to a plurality of adjacent blocks, reference pixels used for intra prediction of each of the plurality of adjacent blocks;
   performing, by using the obtained reference pixels, intra prediction in parallel on each of the plurality of adjacent blocks; and
   adding, to a bitstream, reference pixel syntax information indicating whether the pixels of the peripheral blocks are used and shared as the reference pixels for intra prediction of each of the plurality of adjacent blocks,
   wherein the obtaining the reference pixels comprises obtaining the reference pixels by sharing pixels of an upper peripheral block and a left peripheral block that are processed prior to the plurality of adjacent blocks,
   wherein the plurality of adjacent blocks comprise an upper left block located on (0,0), an upper right block located on (1,0), a lower left block located on (0,1), and a lower right block located on (1,1), and a reference pixel for the upper right block located on (1,0) is obtained by using a pixel of a left peripheral block that is adjacent to a left side of the upper left block located on (0,0) and previously processed, a reference pixel for the lower left block located on (0,1) is obtained by using a pixel of an upper peripheral block that is adjacent to an upper side of the upper left block located on (0,0) and previously processed, and a reference pixel for the lower right block located on (1,1) is obtained by using a pixel of an upper peripheral block that is adjacent to an upper side of the upper right block located on (1,0) and previously processed and a pixel of a left peripheral block that is adjacent to a left side of the lower left block located on (0,1) and previously processed.

2. The method of claim 1, wherein the obtaining the reference pixels comprises obtaining a reference pixel through extrapolation of pixels of an upper peripheral block and a left peripheral block that are processed prior to the plurality of adjacent blocks.

3. A device for encoding a video to perform parallel intra prediction, the device comprising:
   a reference pixel acquirer configured to obtain, by using pixels of peripheral blocks that are processed prior to a plurality of adjacent blocks, reference pixels used for intra prediction of each of the plurality of adjacent blocks;
   an intra prediction performer configured to perform, by using the obtained reference pixels, intra prediction in parallel on the plurality of adjacent blocks; and
   an entropy encoder configured to add, to a bitstream, reference pixel syntax information indicating whether the pixels of the peripheral blocks are used as the reference pixels for intra prediction of each of the plurality of adjacent blocks,
   wherein the reference pixel acquirer is configured to obtain the reference pixels by sharing pixels of an upper peripheral block and a left peripheral block that are processed prior to the plurality of adjacent blocks,
   wherein the plurality of adjacent blocks comprise an upper left block located on (0,0), an upper right block located on (1,0), a lower left block located on (0,1), and a lower right block located on (1,1), and a reference pixel for the upper right block located on (1,0) is obtained by using a pixel of a left peripheral block that is adjacent to a left side of the upper left block located on (0,0) and previously processed, a reference pixel for the lower left block located on (0,1) is obtained by using a pixel of an upper peripheral block that is adjacent to an upper side of the upper left block located on (0,0) and previously processed, and a reference pixel for the lower right block located on (1,1) is obtained by using a pixel of an upper peripheral block that is adjacent to an upper side of the upper right block located on (1,0) and previously processed and a pixel of a left peripheral block that is adjacent to a left side of the lower left block located on (0,1) and previously processed.

4. A method of decoding a video to perform parallel intra prediction, the method comprising:
   obtaining, from a bitstream, reference pixel syntax information indicating whether pixels of peripheral blocks that are processed prior to a plurality of adjacent blocks are used as reference pixels for intra prediction of each of the plurality of adjacent blocks;
   if the obtained reference pixel syntax information indicates that the pixels of the peripheral blocks are used as reference pixels for intra prediction of each of the plurality of adjacent blocks, obtaining the reference pixels used for the intra prediction of each of the plurality of adjacent blocks by using the pixels of the peripheral blocks; and
   performing intra prediction in parallel on each of the plurality of adjacent blocks by using the obtained reference pixels,
   wherein the obtaining the reference pixels comprises obtaining the reference pixels by sharing pixels of an upper peripheral block and a left peripheral block that are processed prior to the plurality of adjacent blocks,
   wherein the plurality of adjacent blocks comprise an upper left block located on (0,0), an upper right block located on (1,0), a lower left block located on (0,1), and a lower right block located on (1,1), and a reference pixel for the upper block located on (1,0) is obtained by using a pixel of a left peripheral block that is adjacent to a left side of the upper left block located on (0,0) and previously processed, a reference pixel for the lower left block located on (0,1) is obtained by using a pixel of an upper peripheral block that is adjacent to an upper side of the upper left block located on (0,0) and previously processed, and a reference pixel for the lower right block located on (1,1) is obtained by using a pixel of an upper peripheral block that is adjacent to an upper side of the upper right block located on (1,0) and previously processed and a pixel of a left peripheral block that is adjacent to a left side of the lower left block located on (0,1) and previously processed.

5. The method of claim 4, wherein the obtaining the reference pixels comprises obtaining the reference pixels through extrapolation of pixels of an upper peripheral block and a left peripheral block that are processed prior to the plurality of adjacent blocks.

6. A device for decoding a video to perform parallel intra prediction, the device comprising:
- an entropy decoder configured to obtain, from a bitstream, reference pixel syntax information indicating whether pixels of peripheral blocks that are processed prior to a plurality of adjacent blocks are used as reference pixels for intra prediction of each of the plurality of adjacent blocks;
- a reference pixel acquirer configured to obtain, by using the pixels of the peripheral blocks, reference pixels used for intra prediction of each of the plurality of adjacent blocks, if the obtained reference pixel syntax information indicates that the pixels of the peripheral blocks are used as the reference pixels for the intra prediction of each of the plurality of adjacent blocks; and
- an intra prediction performer configured to perform intra prediction in parallel on each of the plurality of adjacent blocks by using the obtained reference pixels,
- wherein the reference pixel acquirer is configured to obtain the reference pixels by sharing pixels of an upper peripheral block and a left peripheral block that are processed prior to the plurality of adjacent blocks,
- wherein the plurality of adjacent blocks comprise an upper left block located on (0,0), an upper right block located on (1,0), a lower left block located on (0,1), and a lower right block located on (1,1), and a reference pixel for the upper right block located on (1,0) is obtained by using a pixel of a left peripheral block that is adjacent to a left side of the upper left block located on 0,0) and previously processed, a reference pixel for the lower left block located on (0,1) is obtained by using a pixel of an upper peripheral block that is adjacent to an upper side of the upper left block located on (0,0) and previously processed, and a reference pixel for the lower right block located on (1,1) is obtained by using a pixel of an upper peripheral block that is adjacent to an upper side of the upper right block located on (1,0) and previously processed and a pixel of a left peripheral block that is adjacent to a left side of the lower left block located on (0,1) and previously processed.

* * * * *